(12) United States Patent
Neil et al.

(10) Patent No.: US 8,224,951 B2
(45) Date of Patent: Jul. 17, 2012

(54) DETERMINING OPERATIONAL STATUS OF A MOBILE DEVICE CAPABLE OF EXECUTING SERVER-SIDE APPLICATIONS

(75) Inventors: Tim Neil, Mississauga (CA); Scott Neil, Toronto (CA); Steven Grenier, Georgetown (CA); Paul Chalmers, Windsor (CA)

(73) Assignee: Nextair Corporation, Waterloo (CA)

( * ) Notice: Subject to any disclaimer, the term of this patent is extended or adjusted under 35 U.S.C. 154(b) by 808 days.

(21) Appl. No.: 10/537,705

(22) PCT Filed: Feb. 22, 2005

(86) PCT No.: PCT/CA2005/000241
§ 371 (c)(1),
(2), (4) Date: Jun. 3, 2005

(87) PCT Pub. No.: WO2006/089392
PCT Pub. Date: Aug. 31, 2006

(65) Prior Publication Data
US 2006/0190527 A1 Aug. 24, 2006

(51) Int. Cl.
*G06F 15/173* (2006.01)
(52) U.S. Cl. ....... 709/224; 455/9; 455/67.11; 455/115.1
(58) Field of Classification Search .................. 709/206, 709/224, 217; 700/286; 726/2; 714/47, 714/21, 57; 455/7, 419; 715/513; 702/119; 718/1
See application file for complete search history.

(56) References Cited

U.S. PATENT DOCUMENTS

| | | | |
|---|---|---|---|
| 6,067,582 A | 5/2000 | Smith et al. | |
| 6,088,588 A | 7/2000 | Osborne | |
| 6,167,441 A * | 12/2000 | Himmel | ........................ 709/217 |
| 6,347,398 B1 | 2/2002 | Parthasarathy et al. | |
| 6,438,575 B1 | 8/2002 | Khan et al. | |
| 6,496,979 B1 | 12/2002 | Chen et al. | |
| 6,559,773 B1 | 5/2003 | Berry | |
| 6,590,589 B1 | 7/2003 | Sluiman et al. | |
| 6,609,150 B2 | 8/2003 | Lee et al. | |
| 6,629,284 B1 | 9/2003 | Leermakers | |

(Continued)

FOREIGN PATENT DOCUMENTS

CA 2274866 A1 6/1998

(Continued)

OTHER PUBLICATIONS

English Abstract of JP 2001-306308, HOLY, Method for Defining Class of Data Center Application, Nov. 2, 2001, esp@cenet database—Patent Abstracts of Japan.

(Continued)

*Primary Examiner* — Dustin Nguyen

(57) ABSTRACT

To determine the operational status of a wireless communication device capable of executing server-side applications, a message is sent to the device requesting operational status of the device. The message may be may be triggered by a system administrator at a middleware server. The wireless communication device may receive the message, compose a response message indicative of the operational status of the device, and send the response message back to the middleware server. The messages may be extensible markup language (XML) messages. Composition of the response message may entail verifying that a textual operational status description forming part of the response message omits illegal XML characters, e.g., by passing the description through an XML formatter for removal of any illegal XML characters.

20 Claims, 84 Drawing Sheets

```
                                                            ┌─1600
1   <ARML>
2     <SYS>
3       <PINGRESP TYPE="STATS"/>Send/Receive: 600
4   Server: http://www.airtrix.com
5   Notifications: Coverage loss, coverage gain, queue backup
6   (5)
7   Smart Client Version: 14.1.0.1
8   Errors:
9   21/10/03 14:22:23 - Could not connect (Send Thread::start)
10  21/10/03 11:38:34 - Illegal argument (AXUIEditBox::Display)
11  21/10/03 10:14:22 - Divide overflow (Field::asString)
12  Queue:
13  <ARML<>SYS<>REG ID="4">mobileid<REG<>/SYS<>/ARML>
14  Queued messages: 1
15  Registered Apps: 4,12
16  Open Screen: LOGIN
17  Make & Model: Blackberry 6710
18  Battery Remaining: 44%
19  Memory Free: 2389 bytes
20  Network: Nextel (IDEN)
21  PIN Number: 4AB328CF2
22  OS: 3.6.1.0
23  Date/Time: 21/10/03 16:11:12
24      </PINGRESP>
25    </SYS>
26  <ARML>
```

U.S. PATENT DOCUMENTS

| | | |
|---|---|---|
| 6,701,521 B1 | 3/2004 | McLlroy et al. |
| 6,813,733 B1 * | 11/2004 | Li et al. .......... 714/47 |
| 6,999,717 B2 * | 2/2006 | Spratt et al. .......... 455/7 |
| 7,028,228 B1 * | 4/2006 | Lovy et al. .......... 714/57 |
| 7,100,195 B1 * | 8/2006 | Underwood .......... 726/2 |
| 7,502,962 B2 * | 3/2009 | Yach et al. .......... 714/21 |
| 2001/0031626 A1 | 10/2001 | Lindskog et al. |
| 2001/0044321 A1 | 11/2001 | Ausems et al. |
| 2002/0026447 A1 | 2/2002 | Matsutuka et al. |
| 2002/0116698 A1 | 8/2002 | Lurie et al. |
| 2002/0181060 A1 | 12/2002 | Huang |
| 2002/0198931 A1 | 12/2002 | Murren et al. |
| 2003/0018764 A1 | 1/2003 | Shell et al. |
| 2003/0060896 A9 | 3/2003 | Hulai et al. |
| 2003/0105845 A1 | 6/2003 | Leermakers |
| 2003/0121003 A1 * | 6/2003 | Soshalsky et al. .......... 715/513 |
| 2003/0162534 A1 | 8/2003 | Lee |
| 2004/0015583 A1 * | 1/2004 | Barrett et al. .......... 709/224 |
| 2004/0049362 A1 * | 3/2004 | Volkov et al. .......... 702/119 |
| 2004/0107025 A1 * | 6/2004 | Ransom et al. .......... 700/286 |
| 2004/0117439 A1 | 6/2004 | Levett et al. |
| 2004/0203690 A1 * | 10/2004 | Sprigg et al. .......... 455/419 |
| 2005/0060704 A1 * | 3/2005 | Bulson et al. .......... 718/1 |

FOREIGN PATENT DOCUMENTS

| | | |
|---|---|---|
| EP | 0 730 388 A2 | 4/1996 |
| JP | 2001-306308 | 11/2001 |
| WO | WO 01/48630 A2 | 7/2001 |
| WO | WO 01/77822 A2 | 10/2001 |
| WO | WO 03/096729 | 11/2003 |
| WO | WO 2005/015935 A1 | 2/2005 |

OTHER PUBLICATIONS

Extensible Markup Language (XML) 1.0 (Third Edition), WC3 Recommendation Feb. 4, 2004, http://www.w3.org/TR/2004/REC-xml-20040204.

Goya, Jesus. European Patent Office Communication pursuant to Article 94(3) EPC dated Sep. 7, 2011, in relation to European Patent Application No. 05814483.4, 6 pages.

* cited by examiner

```
         ⎧ <ARML>
         ⎪     <HEAD>_</HEAD>
         ⎪     <SYS>
    72   ⎨         <QUERY>
         ⎪             <PLATFORMS>
         ⎪                 <PLATFORM>WinCE</PLATFORM>
         ⎪             </PLATFORMS>
         ⎪         </REG>
         ⎪     </SYS>
         ⎩ </ARML>

⎧ <ARML>
         ⎪     <HEAD>_</HEAD>
         ⎪     <SYS>
    74   ⎨         <QUERYRESP>
         ⎪             <APP>Order Entry</APP>
         ⎪             <APP>Helpdesk</APP>
         ⎪             <APP>Engineer Dispatch</APP>
         ⎪         </QUERYRESP>
         ⎪     </SYS>
         ⎩ </ARML>

⎧ <ARML>
         ⎪     <HEAD>_</HEAD>
         ⎪     <SYS>
         ⎪         <REG TYPE="ADD">
         ⎪             <CLIENTID>SUNTRESS</CLIENTID>
         ⎪             <MOBILEID>867452</MOBILEID>
    76   ⎨             <NEWMOBILEID>268625</NEWMOBILEID>
         ⎪             <PLATFORMS>
         ⎪                 <PLATFORM>WinCE</PLATFORM>
         ⎪             </PLATFORMS>
         ⎪         </REG>
         ⎪     </SYS>
         ⎩ </ARML>

⎧ <ARML>
         ⎪     <HEAD>_</HEAD>
         ⎪     <SYS>
         ⎪         <REGCONFIRM TYPE="ADD">
         ⎪             <MOBILEID>268625</MOBILEID>
         ⎪             <VALUE>CONFIRM</VALUE>
         ⎪             <INTERFACE>
         ⎪                 <BUTTONS NUM="1">
         ⎪                     <BTN NAME="OK" CAPTION="Send" INDEX="0">
    76   ⎨                     </BTN>
         ⎪                 </BUTTONS>
         ⎪                 <EDITBOXES NUM="3">
         ⎪                     <E3 NAME="To" INDEX="1"></E3>
         ⎪                     <E3 NAME="Subject" INDEX="2"></E3>
         ⎪                     <E3 NAME="Body" INDEX="3"></E3>
         ⎪                 </EDITBOXES>
         ⎪             </INTERFACE>
         ⎪         </REGCONFIRM>
         ⎪     </SYS>
         ⎩ </ARML>
```

FIG. 11

```
1  <ARML>
2      <SYS>
3          <PING TYPE="SIMPLE"/>
4      </SYS>
5  <ARML>
```

```
1 <ARML>
2    <SYS>
3       <PINGRESP TYPE="SIMPLE"/>
4    </SYS>
5 <ARML>
```

FIG. 14

```
1 <ARML>
2    <SYS>
3       <PING TYPE="STATS"/>
4    </SYS>
5 <ARML>
```

```
1   <ARML>
2      <SYS>
3         <PINGRESP TYPE="STATS"/>Send/Receive: 600
4   Server: http://www.airtrix.com
5   Notifications: Coverage loss, coverage gain, queue backup
6   (5)
7   Smart Client Version: 14.1.0.1
8   Errors:
9   21/10/03 14:22:23 - Could not connect (Send Thread::start)
10  21/10/03 11:38:34 - Illegal argument (AXUIEditBox::Display)
11  21/10/03 10:14:22 - Divide overflow (Field::asString)
12  Queue:
13  <ARML<>SYS<>REG ID="4">mobileid<REG<>/SYS<>/ARML>
14  Queued messages: 1
15  Registered Apps: 4,12
16  Open Screen: LOGIN
17  Make & Model: Blackberry 6710
18  Battery Remaining: 44%
19  Memory Free: 2389 bytes
20  Network: Nextel (IDEN)
21  PIN Number: 4AB328CF2
22  OS: 3.6.1.0
23  Date/Time: 21/10/03 16:11:12
24         </PINGRESP>
25      </SYS>
26  <ARML>
```

Appendix "A"

Contents

| | | |
|---|---|---|
| 1 | Introduction | FIG. 17F |
| 1.1 | Purpose of document | FIG. 17F |
| 1.2 | Audience | FIG. 17F |
| 1.3 | Definitions & Acronyms | FIG. 17F |
| 2 | ARML Overview | FIG. 17G |
| 2.1 | ARML design considerations | FIG. 17G |
| 2.2 | ARML usage | FIG. 17H |
| 2.3 | The scratchpad area | FIG. 17H |
| 2.4 | System Variables and Functions | FIG. 17I |
| 2.4.1 | Variables: | FIG. 17I |
| 2.4.2 | Functions: | FIG. 17I |
| 2.5 | Single-Field Lookup | FIG. 17J |
| 3 | ARML application definition | FIG. 17K |
| 3.1 | General | FIG. 17K |
| 3.1.1 | Description | FIG. 17K |
| 3.1.2 | Structure | FIG. 17K |
| 3.1.3 | Tags | FIG. 17K |
| 3.2 | Table Definitions Section | FIG. 17M |
| 3.2.1 | Description | FIG. 17M |
| 3.2.2 | Structure | FIG. 17M |
| 3.2.3 | Tags | FIG. 17M |
| 3.2.4 | Example | FIG. 17N |
| 3.3 | Package Definitions Section | FIG. 17P |
| 3.3.1 | Description | FIG. 17P |
| 3.3.2 | Structure | FIG. 17P |
| 3.3.3 | Tags | FIG. 17P |
| 3.3.4 | Example | FIG. 17S |
| 3.4 | Device Interface Definitions Section | FIG. 17T |
| 3.4.1 | Description | FIG. 17T |
| 3.4.2 | Structure | FIG. 17T |
| 3.4.3 | Tags | FIG. 17T |
| 3.4.4 | Example | FIG. 17V |

FIG. 17A

Appendix "A"

| | | |
|---|---|---|
| 4 | Application-defined packages | FIG. 17W |
| 4.1 | General | FIG. 17W |
| 4.1.1 | Description | FIG. 17W |
| 4.1.2 | Structure | FIG. 17W |
| 4.1.3 | Tags | FIG. 17W |
| 4.2 | Package information | FIG. 17X |
| 4.2.1 | Example | FIG. 17X |
| 5 | User interface Definitions | FIG. 17Z |
| 5.1 | General | FIG. 17Z |
| 5.1.1 | Description | FIG. 17Z |
| 5.1.2 | Structure | FIG. 17Z |
| 5.1.3 | Tags | FIG. 17AA |
| 5.2 | Queries definition section | FIG. 17CC |
| 5.2.1 | Description | FIG. 17CC |
| 5.2.2 | Structure | FIG. 17CC |
| 5.2.3 | Tags | FIG. 17CC |
| 5.3 | Menu definition section | FIG. 17DD |
| 5.3.1 | Description | FIG. 17DD |
| 5.3.2 | Structure | FIG. 17DD |
| 5.3.3 | Tags | FIG. 17DD |
| 5.4 | Buttons definition section | FIG. 17FF |
| 5.4.1 | Description | FIG. 17FF |
| 5.4.2 | Structure | FIG. 17FF |
| 5.4.3 | Tags | FIG. 17FF |
| 5.5 | Text Items definition section | FIG. 17GG |
| 5.5.1 | Description | FIG. 17GG |
| 5.5.2 | Structure | FIG. 17GG |
| 5.5.3 | Tags | FIG. 17GG |
| 5.6 | Edit boxes definition section | FIG. 17HH |
| 5.6.1 | Description | FIG. 17HH |
| 5.6.2 | Structure | FIG. 17HH |
| 5.6.3 | Tags | FIG. 17II |
| 5.7 | Choice items definition section | FIG. 17JJ |
| 5.7.1 | Description | FIG. 17JJ |
| 5.7.2 | Structure | FIG. 17JJ |
| 5.7.3 | Tags | FIG. 17KK |
| 5.8 | Checkboxes definition section | FIG. 17LL |

FIG. 17B

Appendix "A"

| | | |
|---|---|---|
| 5.8.1 | Description | FIG. 17LL |
| 5.8.2 | Structure | FIG. 17LL |
| 5.8.3 | Tags | FIG. 17MM |
| 5.9 | Listboxes definition section | FIG. 17NN |
| 5.9.1 | Description | FIG. 17NN |
| 5.9.2 | Structure | FIG. 17NN |
| 5.9.3 | Tags | FIG. 17NN |
| 5.10 | Grids | FIG. 17PP |
| 5.10.1 | Description | FIG. 17PP |
| 5.10.2 | Structure | FIG. 17PP |
| 5.10.3 | Tags | FIG. 17QQ |
| 5.10.4 | Example | FIG. 17RR |
| 6 | The Smart Client event model | FIG. 17TT |
| 6.1 | The EVENTS tag | FIG. 17UU |
| 6.2 | The EVENT tag | FIG. 17UU |
| 6.2.1 | The BUTTONCLICK event | FIG. 17UU |
| 6.2.2 | The MENUITEMSELECTED event | FIG. 17UU |
| 6.2.3 | The DATA event | FIG. 17UU |
| 6.3 | The ACTION tag | FIG. 17UU |
| 6.3.1 | The OPEN action | FIG. 17VV |
| 6.3.2 | The ARML action | FIG. 17VV |
| 6.3.3 | The SAVE action | FIG. 17VV |
| 6.3.4 | The PURGE action | FIG. 17WW |
| 6.3.5 | The NOTIFY action | FIG. 17WW |
| 6.3.6 | The CLOSE action | FIG. 17WW |
| 6.3.7 | The ALERT action | FIG. 17WW |
| 6.3.8 | The INTEGRATION action | FIG. 17WW |
| 6.3.9 | The CLOSESCREEN action | FIG. 17XX |
| 6.3.10 | The REFRESH action | FIG. 17XX |
| 6.3.11 | The SAVEITEM action | FIG. 17XX |
| 6.3.12 | The IF Action | FIG. 17XX |
| Example of airix event model | | FIG. 17BBB |
| 7 | AVM-server system interactions | FIG. 17DDD |
| 7.1 | General | FIG. 17DDD |
| 7.1.1 | Description | FIG. 17DDD |
| 7.1.2 | Structure | FIG. 17DDD |
| 7.1.3 | Tags | FIG. 17DDD |

FIG. 17C

Appendix "A"

| | | |
|---|---|---|
| 7.2 | Device Registration & deregistration package | FIG. 17EEE |
| 7.2.1 | Description | FIG. 17EEE |
| 7.2.2 | Structure | FIG. 17EEE |
| 7.2.3 | Tags | FIG. 17EEE |
| 7.2.4 | Example | FIG. 17EEE |
| 7.3 | Registration confirmation package | FIG. 17FFF |
| 7.3.1 | Description | FIG. 17FFF |
| 7.3.2 | Structure | FIG. 17FFF |
| 7.3.3 | Tags | FIG. 17FFF |
| 7.3.4 | Example | FIG. 17GGG |
| 7.4 | Find applications package | FIG. 17HHH |
| 7.4.1 | Description | FIG. 17HHH |
| 7.4.2 | Structure | FIG. 17HHH |
| 7.4.3 | Tags | FIG. 17HHH |
| 7.5 | Find applications confirmation package | FIG. 17III |
| 7.5.1 | Description | FIG. 17III |
| 7.5.2 | Structure | FIG. 17III |
| 7.5.3 | Tags | FIG. 17III |
| 7.6 | Application Registration & deregistration package | FIG. 17JJJ |
| 7.6.1 | Description | FIG. 17JJJ |
| 7.6.2 | Structure | FIG. 17JJJ |
| 7.6.3 | Tags | FIG. 17JJJ |
| 7.7 | Application registration & deregistration confirmation package | FIG. 17KKK |
| 7.7.1 | Description | FIG. 17KKK |
| 7.7.2 | Structure | FIG. 17KKK |
| 7.7.3 | Tags | FIG. 17KKK |
| 7.7.4 | Example | FIG. 17LLL |
| 7.8 | Setting the active device package | FIG. 17MMM |
| 7.8.1 | Description | FIG. 17MMM |
| 7.8.2 | Structure | FIG. 17MMM |
| 7.8.3 | Tags | FIG. 17MMM |
| 7.8.4 | Example | FIG. 17MMM |
| 7.9 | Set active device response | FIG. 17MMM |
| 7.9.1 | Description | FIG. 17MMM |
| 7.9.2 | Structure | FIG. 17MMM |
| 7.9.3 | Tags | FIG. 17NNN |
| 7.9.4 | Example | FIG. 17NNN |

FIG. 17D

Appendix "A"

| | | |
|---|---|---|
| 7.10 | Invalid Application package | FIG. 17NNN |
| 7.10.1 | Description | FIG. 17NNN |
| 7.10.2 | Structure | FIG. 17NNN |
| 7.10.3 | Tags | FIG. 17OOO |
| 7.10.4 | Example | FIG. 17OOO |
| 8 | Application-server system interactions | FIG. 17PPP |

FIG. 17E

Appendix "A"

1 Introduction

1.1 Purpose of document
This document describes the structure and syntax of the ARML language.

1.2 Audience
The document is intended to be read by AIRIX developers and users of ARML.

1.3 Definitions & Acronyms

| | |
|---|---|
| ARML | AIRIX Markup Language |
| XML | Extensible Markup Language |

FIG. 17F

Appendix "A"

2 ARML Overview

ARML is an XML markup language used by the AIRIX platform. It performs three tasks;

- Data is passed back and forth between the mobile server, AIRIX platform and enterprise application using ARML.
- The AIRIX Smart Client uses ARML to define the user interface for an AIRIX-enabled application on the mobile device
- The AIRIX server uses ARML to define that data that it stores for the application in its database.

2.1 ARML design considerations
ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

FIG. 17G

Appendix "A"

2.2 ARML usage

The diagram below illustrates how ARML is used.

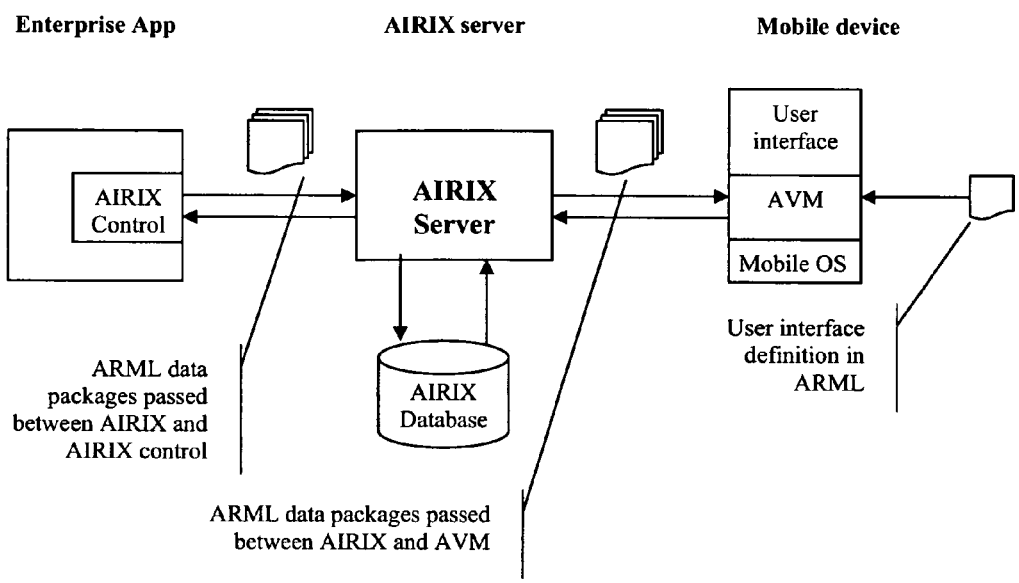

Figure 1 - The ARML environment

The key to ARML usage is the application definition file held on the AIRIX server. This file defines the AIRIX tables for the application, the allowed message set and the user interface definitions for the application on a given device.

2.3 The scratchpad area

The scratchpad is used as a temporary storage area where a global value or a value associated to a screen can be saved for future use. The syntax for a scratchpad value is as follows:
    screen scratchpad value: [SP.*screen.savename*]

FIG. 17H

Appendix "A"

global scratchpad value: [SP.*.*savename*]

The syntax for retrieving a global scratchpad value can also be used to retrieve screen scratchpad values.

2.4 System Variables and Functions

There are several variables that are available that will retrieve application and system values to be used throughout the application. The syntax for these variables are as follows:

2.4.1 Variables:
[DATE] – returns the current system date, formatted as dd mmm yy
[TIME] – returns the current system time, formatted as hh:mm:ss am/pm.
[SYS.VAR.DATE] - returns the current system date, formatted as dd mmm yy
[SYS.VAR.MOBILEID] - retrieves the device's Mobile ID
[SYS.VAR.APPNAME] - retrieves the name of the application.
[SYS.VAR.APPVERSION] - retrieves the version number of the application.
[SYS.VAR.SCVERSION] - retrieves the version number of the Smart Client.
[SYS.VAR.ARMLMAJOR] - retrieves the ARML major version of the application.
[SYS.VAR.ARMLMINOR] - retrieves the ARML minor version of the application.

2.4.2 Functions:
[SYS.FUNC.DATEADD([SYS.VAR.DATE],+-*x*)] - The Date Arithmetic tag is used to add or subtract days from the current date. In the tag, *x* represents the number of days added or subtracted. Developers can also choose to substitute a hard-coded date value in the Date Arithmetic tag, in the place of the [SYS.VAR.DATE] tag.

[SYS.FUNC.DATETOSTR([SYS.VAR.DATE],d mmm yyyy h:nn:ss tz)] - The Date To String tag is used to convert date data to a string value.

[SYS.FUNC.STRTODATE([SYS.VAR.DATE],d mmm yyyy h:nn:ss tz)] - The String to Date tag is used to convert string data to a date value, in the RFC 1123 format.

FIG. 17I

Appendix "A"

2.5 Single-Field Lookup

The single-field lookup will run a simple SELECT query with one where clause to retrieve specific data. The syntax is as follows:

[DB.DOLOOKUP(*table, field, wherefield, wherevalue*)]

FIG. 17J

Appendix "A"

3 ARML application definition

3.1 General
3.1.1 Description
The application definition section defines the AIRIX tables and ARML data packages that are used for transactions involved with a specific application.

3.1.2 Structure
The ARML application definition has the following structure;

```
<ARML>
    <AXSCHDEF>
        <EVENTS>
            <EVENT>
                (action definitions)
            </EVENT>
        </EVENTS>
        <AXTDEFS>
            (table definitions)
        </AXTDEFS>
        <DPACKETS>
            (data package definitions)
        </DPACKETS>
        <DEVICES>
            (device interface definitions)
        </DEVICES>
    </AXSCHDEF>
</ARML>
```

3.1.3 Tags

3.1.3.1 The <AXSCHDEF> tag
These tags (<AXSCHDEF>...</AXSCHDEF>) mark the start and end of the application definition. THE AXSCHDEF tag has two attributes;

| Attribute | Optional? | Description |
|---|---|---|
| APPNAME | No | The name of the application |
| VERSION | No | Which version of the application the file describes |
| DESC | No | A text description of the application for display purposes |
| ARMLMAJOR | No | The major version of the ARML language this application definition was created with. |

FIG. 17K

Appendix "A"

| ARMLMINOR | No | The minor version of the ARML language this application definition was created with. |
|---|---|---|

3.1.3.2 The <EVENTS> tag

The <EVENT>...</EVENT> pair marks the start and end of a user-interface level event definition. See section 6 for a detailed discussion of the Smart Client event model.

3.1.3.3 The <EVENT> tag

The <EVENT>...</EVENT> pair marks the start and end of a user-interface level event definition. See section 6 for a detailed discussion of the Smart Client event model.

3.1.3.4 The <AXTDEFS> tag

The <AXTDEFS>...</AXTDEFS> pair marks the start and end of the table definitions section. It has no attributes.

3.1.3.5 The <DPACKETS> tag

The <DPACKETS>...</DPACKETS> pair marks the start and end of the data package definitions section. It has no attributes.

3.1.3.6 The <DEVICES> tag

The <DEVICES>...</DEVICES> pair marks the start and end of the device interface definitions section. It has no attributes.

FIG. 17L

Appendix "A"

3.2 Table Definitions Section

3.2.1 Description
The table definitions section defines the tables on the mobile device for the application

3.2.2 Structure
The table definitions section has the following structure;

```
{wrapper tags}
<TDEF>
      <FIELDS>
            <FLD>...</FLD>
      <FIELDS>
</TDEF>
 (etc.)
{wrapper tags}
```

3.2.3 Tags

3.2.3.1 The <TDEF> tag
Each table definition is enclosed within the <TDEF>...</TDEF> pair. The TDEF tag has the following attributes;

| Attribute | Optional? | Description |
| --- | --- | --- |
| NAME | No | The number of table definitions in the section |
| PK | No | Which of the table fields is the primary key for the table |
| DELINDEX | No | The index of this table with respect to all the tables for specifying the delete order. This value is 1 based. |

3.2.3.2 The <FIELDS> tag
The <FIELDS>...</FIELDS> tag pair marks where the fields in a given table are defined. The FIELDS tag has a no attributes.

3.2.3.3 The <FLD> tag
The <FLD>...</FLD> tag pair defines a single field in a table. Enclosed between the tags is the field name. The <FLD> tag has the following structure;

| Attribute | Optional? | Description |
| --- | --- | --- |
| TYPE | No | The data type contained in the field. Permitted values are: |

FIG. 17M

Appendix "A"

| | | |
|---|---|---|
| | | INT – integer value<br>STRING – a fixed-length string of n characters (see SIZE field)<br>MEMO – a string of max 65535 characters<br>AUTOINC – an integer value, automatically incremented by the database. This field will be read-only to the applications.<br>DATETIME – a datetime value |
| SIZE | No | If the TYPE is set to STRING, this field specifies the number of characters in the field |
| INDEXED | No | Specifies if the field needs to be indexed in the AIRIX database |
| REFERENCEFIELD | Yes | If this attribute is present, it defines that this field is a foreign key. The foreign table/field is given in the format "table(field)" |
| ALLOWNULL | No | Specifies if the field is allowed to have a null value |

3.2.4 Example
An email application would use 2 tables for storing sent emails.

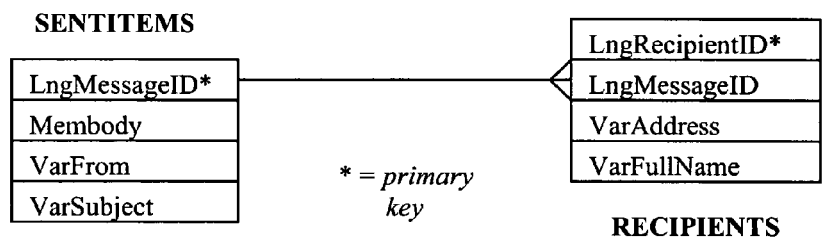

Figure 2 - sample email schema

This translates into the following ARML fragment;

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" REFERENCEFIELD=""
            ALLOWNULL="NO">LNGMESSAGEID</FLD>
        <FLD TYPE="STRING" SIZE="200" INDEXED="NO" REFERENCEFIELD=""
            ALLOWNULL="YES">VARFROM</FLD>
        <FLD TYPE="MEMO" SIZE="0" INDEXED="NO" REFERENCEFIELD=""
            ALLOWNULL="YES">MEMBODY</FLD>
        <FLD TYPE="STRING" SIZE="200" INDEXED="NO" REFERENCEFIELD=""
            ALLOWNULL="YES">VARSUBJECT</FLD>
    </FIELDS>
</TDEF>
<TDEF NAME="RECIPIENTS" UPDATETYPE=NEW PK=LNGRECIPIENTID DELINDEX=1>
    <FIELDS>
        <FLD TYPE="INT" SIZE="AUTOINC" INDEXED="NO" REFERENCEFIELD=""
            ALLOWNULL="NO">LNGMESSAGEID</FLD>
```

FIG. 17N

Appendix "A"

```
    <FLD TYPE="INT" SIZE="0" INDEXED="YES"
         REFERENCEFIELD="SENTITEMS(MESSAGEID)"
         ALLOWNULL="NO">LNGMESSAGEID</FLD>
    <FLD TYPE="STRING" SIZE="200" INDEXED="NO" REFERENCEFIELD=""
         ALLOWNULL="YES">VARFULLNAME</FLD>
    <FLD TYPE="STRING" SIZE="200" INDEXED="NO" REFERENCEFIELD=""
         ALLOWNULL="YES">VARADDRESS</FLD>
  </FIELDS>
</TDEF>
```

Figure 3 - a sample table definition section

FIG. 17O

Appendix "A"

3.3 Package Definitions Section

3.3.1 Description
The package definitions section defines the structure of the application packages and the data that they carry.

3.3.2 Structure
The package definitions section has the following structure;

```
{wrapper tags}
<AXDATAPACKET>
        <TABLEUPDATES>
                <TUPDATE>
                        <PKGFIELDS>
                                <PKGFLD>...</PKGFLD>
                                <PKGFLD>...</PKGFLD>
                        </PKGFIELDS>
                </TUPDATE>
        </TABLEUPDATES>
        <TABLEUPDATES>
                <TUPDATE>
                        <PKGFIELDS>
                                <PKGFLD>...</PKGFLD>
                                <PKGFLD>...</PKGFLD>
                                (etc.)
                        </PKGFIELDS>
                </TUPDATE>
        </TABLEUPDATES>
           (etc.)
</AXDATAPACKET>
{wrapper tags}
```

3.3.3 Tags

3.3.3.1 The <AXDATAPACKET> tag

The <AXDATAPACKET>...</AXDATAPACKET> pair delimits a package definition. The tag has the following attributes;

| Attribute | Optional? | Description |
|---|---|---|
| BODY | No | This field gives the name by which the data package is known |
| UPDATELOCALDATA | No | Specifies whether the package is to update the local database. |
| SENDTOAPP | No | Specifies whether the package is sent to the application server |

FIG. 17P

Appendix "A"

3.3.3.2 The <TABLEUPDATES> tag

The <TABLEUPDATES>...</TABLEUPDATES> pair marks the start and end of the table definitions section. It has no attributes.

3.3.3.3 The <TUPDATE> tag

Each table update is enclosed within the <TUPDATE>...</TUPDATE> pair. The TUPDATE tag has the following attributes;

| Attribute | Optional? | Description |
|---|---|---|
| TABLE | No | The table in the database that is updated |
| UPDATETYPE | No | The type of update that is being made to the database. Possible values are; ADD – adds a new record into the table DELETE – removes a record into the table UPDATE – modifies a record in the table |
| WHEREFIELD | Yes | For a conditional update of a table, specifies the field and table to match on. This is in the format "table(field)". |
| WHEREPARAM | Yes | Text string specifying the value. This tag has no meaning and will be skipped unless the WHEREFIELD attribute has been specified. |
| SECTION | No | An identifier for the section in the data package |
| MULTIROW | No | Boolean field specifying whether multiple rows can be updated by the tag |
| MULTIROWIDENT | Yes | If the MULTIROW attribute is set to 'YES', this field is required and specifies the |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user |

FIG. 17Q

Appendix "A"

|  |  | interface field |
|---|---|---|
| PARAMTYPE | No | This defines the type of parameter. It can take two values;<br>PROP – this means that the parameter appears as part of the tag definition<br>VALUE – this means that the parameter is contained between the two tags. Only one parameter in a given data package can be of this type |

FIG. 17R

Appendix "A"

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
    <TABLEUPDATES>
        <TUPDATE TABLE="SENTITEMS" UPDATETYPE="ADD" WHEREFIELD=""
        WHEREPARAM=""
            WHERETYPE="PROP" SECTION="MAIL" MULTIROW="NO" MULTIROWIDENT="">
        <FIELDS>
            <PKGFLD NAME="LNGMESSAGEID" PARAMTYPE="PROP">MSGID</PKGFLD>
            <PKGFLD NAME="VARFROM" PARAMTYPE="PROP">FROM</PKGFLD>
            <PKGFLD NAME="VARSUBJECT" PARAMTYPE="PROP">SUBJECT</PKGFLD>
            <PKGFLD NAME="MEMBODY" PARAMTYPE="VALUE">DATA</PKGFLD>
        </FIELDS>
    </TUPDATE>
    <TUPDATE TABLE="RECIPIENTS" UPDATETYPE="ADD" WHEREFIELD=""
    WHEREPARAM=""
            WHERETYPE="PROP" SECTION="RECIPS" MULTIROW="YES"
            MULTIROWIDENT="RCP">
        <FIELDS>
            <PKGFLD NAME="LNGMESSAGEID" PARAMTYPE="PROP">MSGID</PKGFLD>
            <PKGFLD NAME="VARFULLNAME" PARAMTYPE="PROP">TO</PKGFLD>
            <PKGFLD NAME="VARADDRESS" PARAMTYPE="PROP">ADDRESS</PKGFLD>
        </FIELDS>
    </TUPDATE>
    </TABLEUPDATES>
</AXDATAPACKET>
```

Figure 4 - a sample package definition

FIG. 17S

Appendix "A"

3.4 Device Interface Definitions Section

3.4.1 Description
The display definitions section contains the user interface definitions for the various mobile devices that an application supports.

3.4.2 Structure
The device display definitions section has the following structure;

```
{wrapper tags}
<DEV>
      <SCREENS>
            <SCREEN>
                  {screen definitions}
            </SCREEN>
      </SCREENS>
</DEV>
(other devices)
{wrapper tags}
```

3.4.3 Tags

3.4.3.1 The <DEV> tag
The <DEV>...</DEV> pair delimits an interface definition for a specific device. The tag has the following attributes;

| Attribute | Optional? | Description |
|---|---|---|
| TYPE | No | The type of device. Allowed values are:<br>RIM – a Research in Motion Blackberry pager<br>WAP – a WAP phone<br>CE – Pocket PC |

3.4.3.2 The <SCREENS> tag
The <SCREENS>...</SCREENS> pair delimits the screens definition for a specific device. The tag has one attribute;

| Attribute | Optional? | Description |
|---|---|---|
| STSCRN | No | The first screen that is displayed when the application starts |

FIG. 17T

Appendix "A"

3.4.3.3 The <SCREEN> tag

The <SCREEN>...</SCREEN> pair, and its contents are described in section 5.1.3.1

Appendix "A"

3.4.4 Example
The following example shows the screen definitions section for an application that allows a user to view their inbox and the mails in it.

```
{wrapper tags}
<DEV TYPE="RIM">
      <SCREENS>
            <SCREEN NAME="INBOX ">
                  {screen definition}
            </SCREEN>
            <SCREEN NAME="VIEWNEWMAIL">
                  {screen definition}
            </SCREEN>
      </SCREENS>
</DEV>
<DEV TYPE="PALM">
      <SCREENS>
            <SCREEN NAME="INBOX">
                  {screen definition}
            </SCREEN>
            <SCREEN NAME="VIEWNEWMAIL">
                  {screen definition}
            </SCREEN>
      </SCREENS>
</DEV>
{wrapper tags}
```

FIG. 17V

Appendix "A"

4 Application-defined packages

This section describes the format of application defined packages.

4.1 General

This section describes the general structure of an application-specific data package. As described in section , ;

4.1.1 Description

System level packages are sent between AIRIX and the application server, and between AIRIX and the AVM

4.1.2 Structure

An application defined package has the following structure;

```
<ARML>
      <HEAD>
            (header information)
      </HEAD>
      <PKG>
            (package information)
      </PKG>
</ARML>
```

4.1.3 Tags

4.1.3.1 The <HEAD> tag

The <HEAD> tag is as described in section 7.1.3.1

4.1.3.2 The <PKG> tag

The <PKG>...</PKG> tags delimit the package data. The PKG tag has the following attributes;

| Attribute | Optional? | Description |
|---|---|---|
| TYPE | No | A text string identifying the type of package being sent |

FIG. 17W

Appendix "A"

4.2 Package information

The format and rules for application-defined data packages depend on the package definitions for that application.

4.2.1 Example

A sample data package following the rules in section 3.3.4 would have a body section like this;

```
{wrapper tags}
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
{wrapper tags}
```

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" UPDATELOCALDATA="NO"
```
Package
```
<BODY TYPE="ME">
```

The package has two sections, which correspond to the two table update sections in the package definition;

FIG. 17X

Appendix "A"

Package Definition

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
    WHERETYPE="PROP" SECTION="RECIPS" MULTIROW="YES"
    MULTIROWIDENT="RCP">
  Package <MAIL MSGID="1" FROM="Tim Neil"

<RECIPS>
    <RCP>
    <RCP>
    <RCP>
</RECIPS>
```

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition

```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
  Package

<RCP MSGID="1" TO="Jeff Jones" ADDRESS="jeff@nextair.com"></RCP>
```

FIG. 17Y

Appendix "A"

5 User interface Definitions

5.1 General

5.1.1 Description
A screen definition file defines a single screen for a specific device.

5.1.2 Structure
A screen definition file has the following structure;

```
<ARML>
    <SCREEN>
        <EVENTS>
            <EVENT>
                <ACTION>...</ACTION>
            </EVENT>
        </EVENTS>
        <QUERIES>
            (menu definition)
        </QUERIES>
        <MENUS>
            (menu definition)
        </MENUS>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
        <GRIDS>
            (check grid definition)
```

FIG. 17Z

Appendix "A"

```
    </GRIDS>
  </SCREEN>
</ARML>
```

5.1.3 Tags

5.1.3.1 The SCREEN tag

The <SCREEN>...</SCREEN> pair marks the start and end of the screen definitions section. It has attribute –

| Attribute | Optional? | Description |
|---|---|---|
| NAME | No | An identifier for the screen. This is used to qualify variables and navigate between screens |
| TITLE | No | The title that appears for the screen. |
| BACKGROUND | Yes | If used, an image that appears behind the interface elements |
| ORDERED | Yes, only applicable on WAP | If yes, WML is created with ORDERED property set to true, if NO, WML is created with ORDERED property set to false. Only applicable on WAP. See WML standard for definition of ORDERED. |

5.1.3.2 The <EVENTS> tag

The <EVENT>...</EVENT> pair marks the start and end of a user-interface level event definition. See section 6 for a detailed discussion of the Smart Client event model.

5.1.3.3 The <EVENT> tag

The <EVENT>...</EVENT> pair marks the start and end of a user-interface level event definition. See section 6 for a detailed discussion of the Smart Client event model.

5.1.3.4 The <ACTION> tag

The <ACTION>...</ACTION> pair marks the start and end of an action definition. See section 6 for a detailed discussion of the Smart Client event model.

5.1.3.5 The QUERIES tag

The <QUERIES>...</QUERIES> pair marks the start and end of the queries definitions section. It has no attributes.

FIG. 17AA

Appendix "A"

5.1.3.6 The MENUS tag
The <MENUS>...</MENUS> pair marks the start and end of the menu definition section. It has no attributes.

5.1.3.7 The BUTTONS tag
The <BUTTONS>...</BUTTONS> pair marks the start and end of the button definitions section. It has no attributes.

5.1.3.8 The TEXTITEMS tag
The <TEXTITEMS>...</TEXTITEMS> pair marks the start and end of the text items section. It has no attributes.

5.1.3.9 The EDITBOXES tag
The <EDITBOXES>...</EDITBOXES> pair marks the start and end of the editboxes section. It has no attributes.

5.1.3.10 The CHOICEITEMS tag
The <CHOICEITEMS>...</CHOICEITEMS> pair marks the start and end of the choiceitems section. It has no attributes.

5.1.3.11 The IMAGES tag
The <IMAGES>...</IMAGES> pair marks the start and end of the images section. It has no attributes.

5.1.3.12 The CHECKBOXES tag
The <CHECKBOXES>...</CHECKBOXES> pair marks the start and end of the checkboxes section. It has no attributes.

5.1.3.13 The LISTBOXES tag
The <LISTBOXES>...</LISTBOXES> pair marks the start and end of the listboxes section. It has no attributes.

5.1.3.14 The GRIDS tag
The <GRIDS>...</GRIDS> pair marks the start and end of the grids section. It has no attributes.

FIG. 17BB

Appendix "A"

5.2 Queries definition section

5.2.1 Description
The queries definition section describes any queries that need to be run to populate a screen.

5.2.2 Structure
The queries definition section has the following structure;

```
{wrapper tags}
<QUERIES>
      <QUERY>
            <W>...</W>
      </QUERY>
</QUERIES>
{wrapper tags}
```

5.2.3 Tags

5.2.3.1 The <QUERIES> tag
The <QUERIES> ... </QUERIES> pair marks the start and end of query definition section. It has no attributes.

5.2.3.2 The <QUERY> tag
The <QUERY>...</QUERY> pair marks the start and end of a given query. It has the following attributes;

| Attribute | Optional? | Description |
|---|---|---|
| NAME | No | Name of the query. |
| TABLE | No | The table in the database that is updated |
| ORDERBY | Yes | Specifies the name of the field in the table that the results are to be ordered on. |
| ORDERDIR | Yes | ASC or DESC, sort ascending or descending respectively. If ORDERBY is present and ORDERDIR is not, ASC is assumed. |

FIG. 17CC

Appendix "A"

5.2.3.3 The <W> tag

The <W>...</W> pair marks the start and end of a given where clause. The value of the parameter is contained within the <W>...</W> tags. This value can be a specific value or a reference to a user interface field in the format "[SP.screen.savename] or [QU.query.field]". It has the following attributes;

| Attribute | Optional? | Description |
|---|---|---|
| F | No | Specifies the field to match on. |
| E | No | Specifies the expression type. Available expression types include:<br>EQ<br>NE<br>LT<br>GT<br>BW (applicable only to fields of type STRING) |

5.3 Menu definition section
5.3.1 Description
The menu definition section describes the menu for a given screen

5.3.2 Structure
The menu definition section has the following structure;

```
{wrapper tags}

<MENUS>
   <MENU>
      <MENUITEM>
         <EVENTS>
            <EVENT>
               <ACTION>...</ACTION>
            </EVENT>
         </EVENTS>
      </MENUITEM>
   </MENU>
</MENUS>
{wrapper tags}
```

5.3.3 Tags

FIG. 17DD

Appendix "A"

5.3.3.1 The <MENUS> tag

The <MENUS> ... </MENUS> pair marks the start and end of menu definition section. It has no attributes.

5.3.3.2 The <MENU> tag

The <MENU> ... </MENU> pair marks the start and end of a menu definition. It has the following attributes.

| Attribute | Optional? | Description |
|---|---|---|
| NAME | No | An internal identifier for the menu |
| CAPTION | No | The text that appears for this item in the menu |

5.3.3.3 The <MENUITEM> tag

The <MENUITEM>...</MENUITEM> pair marks the start and end of a menuitem definition. It has the following tags;

| Attribute | Optional? | Description |
|---|---|---|
| NAME | No | An internal identifier for the menu |
| CAPTION | No | The text that appears for this item in the menu |
| INDEX | Yes | The index of this menu item with respect to all of the menu items on this menu. |
| READONLY | Yes | If True, the menu item is inactive. False is the default. |

5.3.3.4 The <EVENTS> tag

The <EVENT>...</EVENT> pair marks the start and end of a user-interface level event definition. See section 6 for a detailed discussion of the Smart Client event model.

5.3.3.5 The <EVENT> tag

The <EVENT>...</EVENT> pair marks the start and end of a user-interface level event definition. See section 6 for a detailed discussion of the Smart Client event model.

5.3.3.6 The <ACTION> tag

The <ACTION>...</ACTION> pair marks the start and end of an action definition. See section 6 for a detailed discussion of the Smart Client event model.

FIG. 17EE

Appendix "A"

5.4 Buttons definition section

5.4.1 Description
The buttons definition section describes the buttons that appear on a given screen.

5.4.2 Structure
The buttons definition section has the following structure;

```
{wrapper tags}
<BTN>
      <EVENTS>
            <EVENT>
                  <ACTION>...</ACTION>
            </EVENT>
      </EVENTS>
</BTN>
{wrapper tags}
```

5.4.3 Tags

5.4.3.1 The BTN tag

The <BTN>...</BTN> pair marks the start and end of a button definition. It has one attribute –

| Attribute | Optional? | Description |
|---|---|---|
| NAME | No | An identifier for the button. |
| INDEX | No | The order in which the button appears |
| CAPTION | No | The caption that appears on a given button |
| X | Yes | The X-coordinate of the button on the screen. This attribute may not be meaningful in some display environments, in which case it would be skipped without processing by the parser |
| Y | Yes | The Y-coordinate of the button on the screen. This attribute may not be meaningful in some display environments, in which case it would be skipped without processing by the parser |
| HT | Yes | This is the Height of the button. This attribute may not be meaningful in some display environments, in which case it would be skipped without processing by the parser |
| WT | Yes | This is the Width of the Button. This attribute may not be meaningful in some display environments, in which case it would be skipped without processing by the parser |
| READONLY | Yes | If True, the button is not enabled. False is the default. |

FIG. 17FF

Appendix "A"

5.4.3.2 The <EVENTS> tag

The <EVENT>...</EVENT> pair marks the start and end of a user-interface level event definition. See section 6 for a detailed discussion of the Smart Client event model.

5.4.3.3 The <EVENT> tag

The <EVENT>...</EVENT> pair marks the start and end of a user-interface level event definition. See section 6 for a detailed discussion of the Smart Client event model.

5.4.3.4 The <ACTION> tag

The <ACTION>...</ACTION> pair marks the start and end of an action definition. See section 6 for a detailed discussion of the Smart Client event model.

5.5 Text Items definition section
5.5.1 Description
The text items definition

5.5.2 Structure
The text items section has the following structure;

```
{wrapper tags}
<TI>
        <EVENTS>
                <EVENT>
                        <ACTION>...</ACTION>
                </EVENT>
        </EVENTS>
</TI>
{wrapper tags}
```

5.5.3 Tags

5.5.3.1 The TI tag

The <TI>...</TI> pair marks the start and end of the screen definitions section. It has attribute –

| Attribute | Optional? | Description |
|---|---|---|
| INDEX | No | The order in which the text item appears |

FIG. 17GG

Appendix "A"

| NAME | No | An Identifier for the Text Item |
|---|---|---|
| CAPTION | No | Text to appear on the Text Item |
| X | Yes | The X-coordinate of the text item on the screen. This attribute may not be meaningful in some display environments, in which case it would be skipped without processing by the parser |
| Y | Yes | The Y-coordinate of the text item on the screen. This attribute may not be meaningful in some display environments, in which case it would be skipped without processing by the parser |
| HT | Yes | This is the Height of the Text Item. This attribute may not be meaningful in some display environments, in which case it would be skipped without processing by the parser |
| WT | Yes | This is the Width of the Text Item. This attribute may not be meaningful in some display environments, in which case it would be skipped without processing by the parser |

5.5.3.2 The <EVENTS> tag

The <EVENT>...</EVENT> pair marks the start and end of a user-interface level event definitio-n. See section 6 for a detailed discussion of the Smart Client event model.

5.5.3.3 The <EVENT> tag

The <EVENT>...</EVENT> pair marks the start and end of a user-interface level event definition. See section 6 for a detailed discussion of the Smart Client event model.

5.5.3.4 The <ACTION> tag

The <ACTION>...</ACTION> pair marks the start and end of an action definition. See section 6 for a detailed discussion of the Smart Client event model.

5.6 Edit boxes definition section

5.6.1 Description

The edit boxes definition section describes what edit boxes exist for the screen.

5.6.2 Structure

The edit boxes section has the following structure;

FIG. 17HH

Appendix "A"

```
{wrapper tags}
<EB>
       <EVENTS>
              <EVENT>
                     <ACTION>...</ACTION>
              </EVENT>
       </EVENTS>
</EB>
{wrapper tags}
```

5.6.3 Tags

5.6.3.1 The EB tag

The <EB>...</EB> pair marks an edit box definition. It has the following attributes –

| Attribute | Optional? | Description |
|---|---|---|
| NAME | No | An identifier for the edit box. |
| TEXT | No | The text to display in the edit box before any entry has been made. Only used if the DATASRC attribute is invalid or omitted. Can be a scratchpad or query value of the form [SP.screen.savename] or [QU.query.field]. |
| INDEX | No | The order in which the edit box appears |
| CAPTION | No | The caption for on a given edit box. |
| MULTILINE | No | Boolean field that indicates whether the edit box is a multiline field. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| FT | Yes | Specifies the type of value expected (INT, STRING, |

FIG. 17II

Appendix "A"

| | | |
|---|---|---|
| | | MEMO,DATETIME) for the VM to validate prior to continuing a Save. If omitted, STRING is the default data type. |
| DATASRC | Yes | If present, the query and field in the query that populates this edit box. This is given in the format "query.field". |
| READONLY | Yes | If "TRUE" the edit box will be read only, otherwise it is editable. "FALSE is the default value. |

5.6.3.2 The <EVENTS> tag

The <EVENT>...</EVENT> pair marks the start and end of a user-interface level event definition. See section 6 for a detailed discussion of the Smart Client event model.

5.6.3.3 The <EVENT> tag

The <EVENT>...</EVENT> pair marks the start and end of a user-interface level event definition. See section 6 for a detailed discussion of the Smart Client event model.

5.6.3.4 The <ACTION> tag

The <ACTION>...</ACTION> pair marks the start and end of an action definition. See section 6 for a detailed discussion of the Smart Client event model.

5.7 Choice items definition section

5.7.1 Description

The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

5.7.2 Structure

The choice items section has the following structure;

```
{wrapper tags}
<CHOICE>
        <EVENTS>
                <EVENT>
                        <ACTION>...</ACTION>
                </EVENT>
        </EVENTS>
        <ITEMS>
                <I>...</I>
```

FIG. 17JJ

Appendix "A"

```
    </ITEMS>
</CHOICE>
{wrapper tags}
```

5.7.3 Tags

5.7.3.1 The <CHOICE> tag

The <CHOICE>...</CHOICE> pair marks the start and end of a choice item definition. It has these attributes –

| Attribute | Optional? | Description |
|---|---|---|
| NAME | No | An identifier for the choice item. |
| TEXT | No | The text to display in the choice item before any selection has been made. |
| INDEX | No | The order in which the choice item appears |
| CAPTION | No | The caption that appears for a given choice item |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the query and field in the query that populates this choice item. This is given in the format "query.field". |
| IDDATASRC | Yes | If present, the query and field in the query that populates the Ids for this choice item. This is given in the format "query.field". The ID values created by the attributes should correspond directly to the choice item values. I.e. they should create a value, id pair. |
| READONLY | Yes | If "True", the control cannot be modified. "False" is the default. |
| SI | Yes | The value to indicate which item of the choice item is to be selected when loaded. This value will be compared with the ID property (hard-coded items) or the IDDATASRC property (database items). |

FIG. 17KK

Appendix "A"

5.7.3.2 The <ITEMS> tag
The <ITEMS>...</ITEMS> pair marks the start and end of a list of items to be included in the in the choice item. If a datasrc is specified, the <ITEMS> section is ignored.

5.7.3.3 The <I> tag
The <I>...</I> pair marks the start and end of an individual item in the choice items list. It has the following attributes:

| Attribute | Optional? | Description |
| --- | --- | --- |
| ID | Yes | An id used to identify this item in the list. |

The value between the pair is the text value that is to be displayed in the choice item.

5.7.3.4 The <EVENTS> tag
The <EVENT>...</EVENT> pair marks the start and end of a user-interface level event definition. See section 6 for a detailed discussion of the Smart Client event model.

5.7.3.5 The <EVENT> tag
The <EVENT>...</EVENT> pair marks the start and end of a user-interface level event definition. See section 6 for a detailed discussion of the Smart Client event model.

5.7.3.6 The <ACTION> tag
The <ACTION>...</ACTION> pair marks the start and end of an action definition. See section 6 for a detailed discussion of the Smart Client event model.

5.8 Checkboxes definition section
5.8.1 Description
The checkboxes section describes a check box that appears on a given screen.

5.8.2 Structure
The checkboxes section has the following structure;

FIG. 17LL

Appendix "A"

```
{wrapper tags}
      <CHK>
            <EVENTS>
                  <EVENT>
                        <ACTION>...</ACTION>
                  </EVENT>
            </EVENTS>
      </CHK>
{wrapper tags}
```

5.8.3 Tags

5.8.3.1 The CHK tag

The <CHK>...</CHK> pair marks a check box definition

| Attribute | Optional? | Description |
|---|---|---|
| NAME | No | An identifier for the check box. |
| INDEX | No | The index of this control with respect to the list of all controls on the screen. |
| CAPTION | No | The text to be displayed for this check box if the DATASRC is not available or is not specified. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| HT | Yes | The Height of the Checkbox. This attribute may not be meaningful in some display environments, in which case it would be skipped without processing by the parser |
| WT | Yes | The Width of the Checkbox. This attribute may not be meaningful in some display environments, in which case it would be skipped without processing by the parser |
| DATASRC | Yes | If present, the query and field in the query that populates this check box. This is given in the format "query.field". |
| VALUE | Yes | If present, specifies the initial state of the check box ('TRUE' = checked, 'FALSE' = Unchecked. If unspecified, FALSE is the default value. |
| READONLY | Yes | If "TRUE" the check box cannot be modified. "FALSE" is the default value. |

FIG. 17MM

Appendix "A"

5.8.3.2 The <EVENTS> tag
The <EVENT>...</EVENT> pair marks the start and end of a user-interface level event definition. See section 6 for a detailed discussion of the Smart Client event model.

5.8.3.3 The <EVENT> tag
The <EVENT>...</EVENT> pair marks the start and end of a user-interface level event definition. See section 6 for a detailed discussion of the Smart Client event model.

5.8.3.4 The <ACTION> tag
The <ACTION>...</ACTION> pair marks the start and end of an action definition. See section 6 for a detailed discussion of the Smart Client event model.

5.9 Listboxes definition section
5.9.1 Description
The listboxes section describes a list box that appears on a given screen.

5.9.2 Structure
The listboxes section has the following structure;

```
{wrapper tags}
      <LB>
            <EVENTS>
                  <EVENT>
                        <ACTION> ... </ACTION>
                  </EVENT>
            </EVENTS>
            <ITEMS>
                  <I> ... </I>
            </ITEMS>
      </LB>
{wrapper tags}
```

5.9.3 Tags

5.9.3.1 The LB tag
The <LB>...</LB> pair marks a list box definition

FIG. 17NN

Appendix "A"

| Attribute | Optional? | Description |
|---|---|---|
| NAME | No | An identifier for the list box. |
| INDEX | No | The index of this control with respect to all of the controls on the screen. |
| CAPTION | No | The text to be displayed as the title of this list box, where applicable. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the list box on the screen. This attribute may not be meaningful in some display environments, in which case it would be skipped without processing by the parser |
| Y | Yes | The Y-coordinate of the list box on the screen. This attribute may not be meaningful in some display environments, in which case it would be skipped without processing by the parser |
| HT | Yes | The Height of the Listbox. This attribute may not be meaningful in some display environments, in which case it would be skipped without processing by the parser |
| WT | Yes | The Width of the Listbox. This attribute may not be meaningful in some display environments, in which case it would be skipped without processing by the parser |
| DATASRC | Yes | If present, the query and field in the query that populates this list box. This is given in the format "query.field". |
| IDDATASRC | Yes | If present, the query and field in the query that populates the list box Ids. This is given in the format "query.field". This value will create a list of ID values that correspond to the list box values in DATASRC. I.e. they should create a value, id pair. |
| READONLY | Yes | If "TRUE" the list box cannot be modified. "FALSE" is the default. |
| SI | Yes | The value to indicate which item of the choice item is to be selected when loaded. This value will be compared with the ID property (hard-coded items) or the IDDATASRC property (database items). |

5.9.3.2 The <ITEMS> tag

The <ITEMS>...</ITEMS> pair marks the start and end of a list of items to be included in the in the list box. If a datasrc is specified, the <ITEMS> section is ignored.

5.9.3.3 The <I> tag

The <I>...</I> pair marks the start and end of an individual item in the list box items list. It has the following attributes:

FIG. 1700

Appendix "A"

| Attribute | Optional? | Description |
|---|---|---|
| ID | Yes | An id used to identify this item in the list. |

The value between the pair is the text value that is to be displayed in the list box. Can be a scratchpad or query value of the form [SP.screen.savename] or [QU.query.field].

5.9.3.4 The <EVENTS> tag
The <EVENT>...</EVENT> pair marks the start and end of a user-interface level event definition. See section 6 for a detailed discussion of the Smart Client event model.

5.9.3.5 The <EVENT> tag
The <EVENT>...</EVENT> pair marks the start and end of a user-interface level event definition. See section 6 for a detailed discussion of the Smart Client event model.

5.9.3.6 The <ACTION> tag
The <ACTION>...</ACTION> pair marks the start and end of an action definition. See section 6 for a detailed discussion of the Smart Client event model.

5.10 Grids

5.10.1 Description
Grids allow data to be displayed in row-column format. Grids can display data from a data source (query) or they can contain hard coded values. Each column in a grid can be visible or hidden. Hidden values are maintained, but not visible to the user.

5.10.2 Structure
The grids section has the following structure;

```
{wrapper tags}
    <GRID>
        <COLS>
            <COL> ... </COL>
        </COLS>
        <ROWS>
            <R>
                <V> ... </V>
```

FIG. 17PP

Appendix "A"

```
        </R>
      </ROWS>
   </GRID>
{wrapper tags}
```

5.10.3 Tags

5.10.3.1  GRID Tag

<GRID>...</GRID> The grid item itself will have the following attributes

| Attribute | Optional? | Description |
|---|---|---|
| NAME | No | An identifier for the edit box. |
| INDEX | No | The order in which the edit box appears |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| GRDSRC | Yes | This is the Query on the screen that will provide the data to the grid. No field name will be specified in this value |

5.10.3.2  COLS Tag

<COLS>...</COLS> This tag contains no attributes. But instead contains all the columns that are associated with the grid in the order in which they appear from left to right.

5.10.3.3  COL Tag

<COL>...</COL> This tag will determine the column specification for the grid. The attributes for this item are the following:

| Attribute | Optional? | Description |
|---|---|---|

FIG. 17QQ

Appendix "A"

| CAPTION | Yes | This is the caption that appears at the top of the grid where applicable. |
|---|---|---|
| FIELDNAME | Yes | This field name represents the Field to pull information from out of the GRDSRC of the grid control. |
| SAVE | No | This true false value will be checked when the SAVE action is called to save values to the scratchpad |
| SAVENAME | Yes | This is the name in which the data will be saved when the SAVE action is called and the column is marked for Saving |
| WT | Yes | The Width of the Edit Box. This attribute may not be meaningful in some display environments, in which case it would be skipped without processing by the parser |

5.10.3.4 ROWS Tag

<ROWS>...</ROWS> This will Indicate any hard coded rows that would be created in the design studio. It does not contain any attributes but instead contains all the row definitions.

5.10.3.5 R Tag

<R>...</R> This is the row declaration that contains all the values for the row that has been hard coded. It has no attributes itself, but contains the value definitions for the row.

5.10.3.6 V Tag

<V>...</V> This definition contains the data that is related to the ROW and to the column.

5.10.4 Example

An example of a grid declaration is as follows:

```
<GRID INDEX="2" NAME="mygrid" X="10" Y="50" HT="100" WT="100" GRDSRC="QUERY1">
<COLS>
<COL CAPTION="Id" FIELDNAME="lngID" SAVE="TRUE" SAVENAME="lngID" WT="20"></COL>
<COL CAPTION="Subject" FIELDNAME="strSubject" SAVE="TRUE" SAVENAME="Sub" WT="80"></COL>
</COLS>
<ROWS>
  <R>
    <V>343432</V>
    <V>This is a subject</V>
  </R>
  <R>
```

FIG. 17RR

Appendix "A"

```
    <V>5456</V>
    <V>This is another subject</V>
   </R>
 </ROWS>
</GRID>
```

FIG. 17SS

Appendix "A"

6 The Smart Client event model

The Smart Client has a set of actions that it ties to events. Events can occur at the application level, the screen level or the user interface item level; an application level event is listened for throughout the operation of the application, a screen level event is listened for while the screen is displayed, and so on. If an action for an event is defined at multiple levels, the lowest level has precedence; i.e., user interface actions override screen level actions, which override application level actions. An attempt to list an event multiple times at the same level (application, screen, item) is invalid and will generate an error message.

The following ARML fragment illustrates this schema (tags and attributes not relevant to the event model have been omitted);

```
<AXTSCHDEF>
    <EVENTS>
        <EVENT>
            <ACTION>...</ACTION>
            <ACTION>...</ACTION>
        <EVENTS>
        <EVENT>
            <ACTION>...</ACTION>
        </EVENT>
    </EVENTS>
    <INTERFACE>
        <SCREEN>
            <EVENT>
                <ACTION>...</ACTION>
            </EVENT>
            <EVENT>
                <ACTION>...</ACTION>
            </EVENT>
            <BUTTON>
                <EVENT>
                    <ACTION>...</ACTION>
                </EVENT>
                <EVENT>
                    <ACTION>...</ACTION>
                </EVENT>
            </BUTTON>
        </SCREEN>
    </INTERFACE>
</AXTSCHDEF>
```

FIG. 17TT

Appendix "A"

6.1 The EVENTS tag

The <EVENTS>...</EVENTS> pair marks the start and end of the events section. It has no attributes.

6.2 The EVENT tag

The <EVENT>...</EVENT> pair marks the start and end of an event definition. It has the following attributes;

| Attribute | Optional? | Description |
|---|---|---|
| TYPE | No | The type of event that should be performed when the button is pushed. Allowed values are;<br>BUTTONCLICK<br>MENUITEMSELECTED<br>DATA |

6.2.1 The BUTTONCLICK event
The button click event occurs when the user selects a button. It has no attributes.

6.2.2 The MENUITEMSELECTED event
The menu items selected event occurs when the user selects a menu item. It has no attributes.

6.2.3 The DATA event
The data event occurs when ARML data is received from the wireless interface. It has the following attributes;

| Attribute | Optional? | Description |
|---|---|---|
| NAME | No | The identifier of the specific package |

6.3 The ACTION tag

The <ACTION>...</ACTION> pair marks the start and end of an event definition. It has one fixed attribute, and a number of attributes that may or may not appear depending on the type of action required. The fixed attribute is;

| Attribute | Optional? | Description |
|---|---|---|
| TYPE | No | The type of action that should be performed when the button is pushed. |

FIG. 17UU

Appendix "A"

| | | Allowed values are;<br>OPEN<br>ARML<br>SAVE<br>PURGE<br>NOTIFY<br>CLOSE<br>ALERT<br>IF...Then...Else<br>CLOSESCREEN<br>REFRESH<br>SAVEITEM |
|---|---|---|

6.3.1 The OPEN action

The open action tells the Smart Client to open a new screen. It adds one extra attribute to the ACTION tag;

| Attribute | Optional? | Description |
|---|---|---|
| NAME | No | The name of the screen to open |
| NEWINST | Yes | If true, a new instance of the screen is created. If false, the least recently used instance of the screen is opened and the data is not refreshed. True is the default. |

6.3.2 The ARML action

The arml action tells the Smart Client to compose and send an arml package. It does not add any attributes to the ACTION tag, but has the following subtag;

*<ARMLTEXT>*

Contained between the <ARMLTEXT>...</ARMLTEXT> pair is one of the application-defined data packages. Individual data items are marked with the user interface item that their value should be taken from, in the format "[SP.*screen.savename*]", or [QU.*query.field*]. If *screen* is not the current screen, then the Smart Client will look for the data in its scratchpad. See section 0 for an example of the ARML action.

6.3.3 The SAVE action

The save action tells the Smart Client to save all fields marked as persistent (i.e., they are defined with SAVE="Yes") to be saved to the scratchpad area. It has no attributes.

FIG. 17VV

Appendix "A"

6.3.4 The PURGE action
The purge action tells the Smart Client to clear all fields that have been saved to the scratchpad. It has no attributes.

6.3.5 The NOTIFY action
The notify action tells the Smart Client to activate the configured notification on a device. For devices where this has no meaning, it will cause a beep to be played. It has no attributes.

6.3.6 The CLOSE action
The close action tells the Smart Client to close the application. It has no attributes.

6.3.7 The ALERT action
The alert action tells the Smart Client to display an alert item (e.g., a message box on Windows, an alert box on the RIM pager, an alert card on WAP). It has the following attributes;

| Attribute | Optional? | Description |
|---|---|---|
| CAPTION | Yes | The caption to display in the title bar of the message box |
| TEXT | Yes | The text to display in the message box |

6.3.8 The INTEGRATION action
The integration action tells the Smart Client to pass data to an interface exposed on a device. For example a COM interface on Pocket PC. This action will allow the developer to pass a parameter into an exposed method and then also save the result of that method in a global scratchpad value. The contents of the integration action's element are the input values to be passed to the interface. It has the following attributes;

| Attribute | Optional? | Description |
|---|---|---|
| CLSID | No | This is the class identifier of the component that is to be called. |
| SAVE | No | This tells the smart client if it should save the result into a global scratchpad value or not. |
| SAVENAME | Yes | This is the name of the global scratchpad value |

Example ARML:

FIG. 17WW

Appendix "A"

```
<ACTION TYPE="INTEGRATION" CLSID="AirixSignature.AirixSignatureCtrl"
SAVENAME="" SAVE="FALSE">[SP.*.SIGNATURE]</ACTION>
```

6.3.9 The CLOSESCREEN action
The close screen action tells the Smart Client to close all open instances of the screen specified by name in the NAME attribute. This action has the following attributes:

| Attribute | Optional? | Description |
|---|---|---|
| NAME | No | Name of the screen to close. |

6.3.10 The REFRESH action
The refresh action tells the Smart Client to re-run any queries and re-initialize all UI elements on the screen with the name specified by the NAME attribute. If there are multiple open instances of the screen, all open instances will be refreshed. The refresh action has the following attributes:

| Attribute | Optional? | Description |
|---|---|---|
| NAME | No | Name of the screen to refresh. |

6.3.11 The SAVEITEM action
The saveitem action tells the Smart Client to create a new scratchpad item or to edit an existing scratchpad item. The value of the scratchpad item is defined within the <ACTION>...</ACTION> tags. The saveitem action has the following attributes:

| Attribute | Optional? | Description |
|---|---|---|
| SPN | No | Name of the scratchpad item to create or modify. |

6.3.12 The IF Action
This action will contain two lists of actions. One a list of actions to perform if the condition evaluates to TRUE (IFLIST), and another list of actions to perform if the condition evaluates to FALSE (ELSEIFLIST).

The structure of the action is as follows:
```
<ACTION TYPE="IF>
    <COND EVAL="parameter" TYPE="condition type" VALUE="literal">
    </COND>
    <IFLIST>
```

FIG. 17XX

Appendix "A"

```
        <ACTION></ACTION>
    </IFLIST>
    <ELSEIFLIST>
        <ACTION></ACTION>
    </ELSEIFLIST>
</ACTION>
```

6.3.12.1 Conditions (COND)

Conditions are used in conjunction with the IF Action. Conditions are specified as follows:

| Attribute | Optional? | Description |
|---|---|---|
| EVAL | NO | Specifies the parameter to be evaluated. Can be hard coded, scratchpad, or query values. It is the "input" to the function. |
| TYPE | NO | Specifies the type of the condition. Possible values are:<br>LESSTHAN<br>MORETHAN<br>EQUALS<br>ISNUMERIC<br>ISALPHA<br>ISEMAIL<br>ISFORMAT<br>MAXCHARS<br>MINCHARS |
| VALUE | Depends on TYPE | The value that EVAL will be evaluated against. Not relevant for all conditions. |

The following is a description of each of the supported conditions:
- EQUALS, this function will take an input and a value to evaluate the input against. If the two items are determined to be Equal, the condition will return true. If they are not equal, the condition will return false. The value and the input must be of the same data type, otherwise the condition will return false. Memo values will be treated as a string and auto-increment types will be treated as integers. The following criteria will be used to determine equality:
    - Two strings are equal if each of the characters in the strings is identical and the strings have the same number of characters. The string comparison will not be case sensitive.
    - Two integers are equal if their values are mathematically equal.
- MORETHAN, this function will take an input and a value to evaluate the input against. If the input is determined to be greater in value than the evaluation

FIG. 17YY

Appendix "A"

value, the condition will return true. If the values are equal, false is returned. If the evaluation value is determined to be greater than the input, the function will return false. The evaluation value and the input must be of the same data type, otherwise an error condition will occur. Memo values will be treated as a string and the auto-increment type will be treated as an integer. The following criteria will be used to determine which value is greater:
- o String A is more in value than String B if String A occurs before String B in alphabetical order.
- o Integer A is greater than Integer B if A > B, mathematically.
- LESSTHAN, this function will take an input and a value to evaluate the input against. If the input is determined to be lesser in value than the evaluation value, the condition will return true. If the values are equal, false is returned. If the evaluation value is determined to be lesser than the input, the function will return false. The evaluation value and the input must be of the same data type, otherwise an error condition will occur. Memo values will be treated as a string and the auto-increment type will be treated as an integer. The following criteria will be used to determine which value is greater:
  - o String A is lesser in value than String B if String A occurs after String B in alphabetical order.
  - o Integer A is greater than Integer B if A < B, mathematically.
- ISNUMERIC, this function will take an input and evaluate whether or not it is a value number. If the input can be converted successfully to a number, the function will return true. If the input cannot be converted to a number, the function will return false. All input values will be treated as a string data type.
- ISALPHA, this function will take an input and evaluate whether or not it contains only alphabetic characters. Alphabetic characters are defined as all characters from A-Z, a-z,, and spaces. All input values will be treated as a string data type.
- ISEMAIL, this function will take an input and evaluate whether or not it contains a string of the form *something@something*. All input values will be treated as a string data type.
- ISFORMAT, this function will take an input and a value to evaluate the input against. If the input is determined to be formatted as the evaluation value, the condition will return true. If the evaluation value is determined to be formatted differently than the input, the function will return false. The evaluation value must comply with the ARML formatting standards.

FIG. 17ZZ

Appendix "A"

- MAXCHARS, this function will take an input and evaluate whether or not the number of characters in the string is less than or equal to the evaluation value passed into the function. If the number of characters in the string is less than or equal to the evaluation value, true is returned. If the number of characters in the string is greater than the evaluation value, false is returned. All input values will be treated as a string data type.
- MINCHARS, this function will take an input and evaluate whether or not the number of characters in the string is greater than or equal to the evaluation value passed into the function. If the number of characters in the string is greater than or equal to the evaluation value, true is returned. If the number of characters in the string is less than the evaluation value, false is returned. All input values will be treated as a string data type.

Example:
```
<ACTION TYPE="IF">
        <COND EVAL="[QUERY1.STRREAD]" TYPE="EQUALS" VALUE="READ"></COND>
        <IFLIST>
                <ACTION TYPE="SAVE"></ACTION>
                <ACTION TYPE="OPEN" NAME="INBOX" NEWINST="FALSE"></ACTION>
        </IFLIST>
        <ELSELIST>
                <ACTION TYPE="OPEN" NAME="MSGREAD" NEWINST="FALSE"></ACTION>
        </ELSELIST>
</ACTION>
```

FIG. 17AAA

Appendix "A"

Example of airix event model

The following example serves to illustrate how a screen is used to compose a data package to be sent back to the AIRIX server. The example used is a screen giving the bare functionality for composing a basic email message – to simplify the example, the user cannot cancel the action, and multiple recipients are not allowed.

```
<ARML>
    <SCREEN NAME="NewMsg">
        <BUTTONS>
            <BTN NAME="OK" CAPTION="Send" INDEX="0">
                <EVENTS>
                    <EVENT TYPE="MODIFY">
                        <ACTION TYPE="ARML">
                            <ARMLTEXT>
                                <BODY TYPE="ME">
                                    <ME MSGID="1" FROM="Tim Neil"
                                        SUBJECT="[SP.NewMsg.Subject]">
                                        <DATA>[SP.NewMsg.Body]</DATA>
                                        <RECIPS>
                                            <RCP MSGID="1"
                                                TO="[SP.NewMsg.To]"></RCP>
                                        </RECIPS>
                                    </ME>
                                </BODY>
                            </ARMLTEXT>
                        </ACTION>
                    </EVENT>
                </EVENTS>
            </BTN>
        </BUTTONS>
        <EDITBOXES>
            <EB NAME="To" INDEX="1"></EB>
            <EB NAME="Subject" INDEX="2"></EB>
            <EB NAME="Body" INDEX="3"></EB>
        </EDITBOXES>
    </SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

FIG. 17BBB

Appendix "A"

There is one button on the screen, with the name of 'OK';

```
<BTN NAME="OK" CAPTION="Send" INDEX="0">
```

When the user clicks on OK, the button composes an ARML package to be sent to the AIRIX server;

```
<EVENT>
    <ACTION TYPE="ARML">
```

The ARML package sent is an 'ME' package as described in the example in section 4.2.1. It is composed as follows;

```
<BODY TYPE="ME">
    <ME MSGID="1" FROM="Tim Neil"
        SUBJECT="[SP.NewMsg.Subject]">
        <DATA>[SP.NewMsg.Body]</DATA>
        <RECIPS>
            <RCP MSGID="1" TO="[SP.NewMsg.To]"></RCP>
        </RECIPS>
    </ME>
</BODY>
```

The subject field is taken from the edit box named 'Subject';

```
<ME MSGID="1" FROM="Tim Neil" SUBJECT="[SP.NewMsg.Subject]">
```

The recipients field is taken from the edit box named 'Subject';

```
<RECIPS>
    <RCP MSGID="1" TO="[SP.NewMsg.To]"></RCP>
</RECIPS>
```

Finally the text of the message is filled from the 'Body' field;

```
<DATA>[SP.NewMsg.Body]</DATA>
```

FIG. 17CCC

Appendix "A"

7 AVM-server system interactions

This section describes the primitives that are used for system-level interactions that the AIRIX Smart Client has with the AIRIX server.

7.1 General

7.1.1 Description

System level packages are sent between AIRIX and the AVM (wirelessly).

7.1.2 Structure

System interactions are performed by exchanging ARML data packages with the following structure;

```
<ARML>
<HEAD>...</HEAD>
<SYS>
{data}
</SYS>
</ARML>
```

7.1.3 Tags

7.1.3.1 The <HEAD> tag

The package header is delimited by the <HEAD>...</HEAD> tags. Contained in text between the two tags is the id of the destination mobile. The HEAD tag has the following attributes;

| Attribute | Optional? | Description |
| --- | --- | --- |
| DT | No | The date & time in RFC 1123 format (including time zone) |
| ID | No | A unique ID for the message |
| VERSION | No | The version number of the application (currently "2.0") |
| APPNAME | No | The application name ("0" for System Messages) |
| DEVICE | No | A numeric constant identifying the device |
| PID | Yes | A unique value used to designate a device. |
| AVMV | No | The version number of the Smart Client. |

7.1.3.2 The <SYS> tag

The <SYS>...</SYS> pair contains the actual system package. The tag does not have any attributes.

FIG. 17DDD

Appendix "A"

7.2 Device Registration & deregistration package

7.2.1 Description
Device registration packages are sent from the AVM to the AIRIX server when a user registers their device.

7.2.2 Structure
A device registration package has the following structure;

```
{wrapper tags}
<REG>
      <USERNAME> {data} </USERNAME>
      <PASSWORD> {data} </PASSWORD>
</REG>
{wrapper tags}
```

7.2.3 Tags

7.2.3.1 The <REG> tag
The <REG>...</REG> pair delimit the registration request. The tag has no attributes.

7.2.3.2 The <USERNAME> tag
The <USERNAME>...</ USERNAME > pair contain the user name. The tag does not have any attributes.

7.2.3.3 The <PASSWORD> tag
The <PASSWORD>...</PASSWORD> pair contain the password. The tag does not have any attributes.

7.2.4 Example
This package would be sent by a user, to register their device under a given name;

```
{wrapper tags}
<REG>
      <USERNAME>SUNTRESS</USERNAME>
      <PASSWORD>MYPASS</PASSWORD>
</REG>
{wrapper tags}
```

FIG. 17EEE

Appendix "A"

7.3 Registration confirmation package

7.3.1 Description
This packages is sent back from the AIRIX server to the AVM to confirm that the device has been registered.

7.3.2 Structure
A registration confirmation package has the following structure;

```
{wrapper tags}
<REGCONFIRM>
      <VALUE> {data} </VALUE>
      <APPS>
            <APP></APP>
            <APP></APP>
      </APPS>
</REGCONFIRM>
{wrapper tags}
```

7.3.3 Tags

7.3.3.1 The <REGCONFIRM> tag
The <REGCONFIRM>...</REGCONFIRM> pair delimit the confirmation. The tag has no attributes.

7.3.3.2 The <VALUE> tag
The <VALUE>...</VALUE> pair contains the status of the registration request. The following text strings are allowable;

CONFIRM – this means that the registration request was successful
NOTREGPLATFORM – this means that the registration request failed because the device is not registered for the platform
INVALIDUSERPASS – this means that the registration request failed because the user name or password was not valid
NODEVICE – this means that the registration request failed because the device was not registered previously by an application

7.3.3.3 The <APPS> tag
The <APPS>...</APPS> pair contains a list of applications for the device.

FIG. 17FFF

Appendix "A"

7.3.3.4 The <APP> tag

The <APP>...</APP> pair contains an application header. It has the following attributes;

| Attribute | Optional? | Description |
|---|---|---|
| ID | No | The application ID |
| NAME | No | The name of the application |
| DESCRIPTION | No | A text description of the application |
| REG | No | 'YES' if the user is registered for this application. 'NO' if they are not. |

7.3.4 Example

This package would be sent to confirm the example request in section 7.2.4;

```
{wrapper tags}
<REGCONFIRM>
        <VALUE>CONFIRM</VALUE>
        <APPS>
            <APP ID="4" NAME="EMAIL" DESCRIPTION="E-Mail Application" REG="YES">
            <APP ID="22" NAME="STOCKS" DESCRIPTION="Stock Quotes" REG="NO">
        </APPS>
</REGCONFIRM>
{wrapper tags}
```

FIG. 17GGG

Appendix "A"

7.4 Find applications package

7.4.1 Description
Find applications packages are sent from the AIRIX component to the AIRIX server when a user wishes to refresh their list of applications on a device

7.4.2 Structure
A device registration package has the following structure;

```
{wrapper tags}
<FINDAPPS>
</FINDAPPS>
{wrapper tags}
```

7.4.3 Tags

7.4.3.1 The <FINDAPPS> tag
The <FINDAPPS>...</FINDAPPS> pair delimit the application registration request. It has no attributes.

FIG. 17HHH

Appendix "A"

7.5 Find applications confirmation package

7.5.1 Description

This package is sent back from the AIRIX server to the AVM to and contains a list of applications available for the user

7.5.2 Structure

A registration confirmation package has the following structure;

```
{wrapper tags}
<FINDAPPSCONFIRM>
      <APPS>
            <APP></APP>
            <APP></APP>
      </APPS>
</FINDAPPSCONFIRM>
{wrapper tags}
```

7.5.3 Tags

7.5.3.1 The <FINDAPPSCONFIRM> tag

The <FINDAPPSCONFIRM>...</FINDAPPSCONFIRM> pair delimit the confirmation. The tag has no attributes.

7.5.3.2 The <APPS> tag

The <APPS>...</APPS> pair contains a list of applications for the device.

7.5.3.3 The <APP> tag

The <APP>...</APP> pair contains an application header. It has the following attributes;

| Attribute | Optional? | Description |
|---|---|---|
| ID | No | The application ID |
| NAME | No | The name of the application |
| DESCRIPTION | No | A text description of the application |
| REG | No | 'YES' if the user is registered for the application. 'NO' if they are not. |

FIG. 17III

Appendix "A"

7.6 Application Registration & deregistration package

7.6.1 Description
Application registration packages are sent from the AIRIX component to the AIRIX server when a user wishes to register or deregister for an application.

7.6.2 Structure
A device registration package has the following structure;

```
{wrapper tags}
<APPREG>
</APPREG>
{wrapper tags}
```

7.6.3 Tags

7.6.3.1 The <APPREG> tag
The <APPREG>...</APPREG> pair delimit the application registration request. The tag has the following attributes;

| Attribute | Optional? | Description |
|---|---|---|
| TYPE | No | This defines the type of parameter. It can take two values; ADD – this means that the application is to be added to the registration database DELETE – this means that the application is to be removed to the registration database |
| ID | No | The ID of the application being registered/deregistered |

FIG. 17JJJ

Appendix "A"

7.7 Application registration & deregistration confirmation package

7.7.1 Description
This packages is sent back from the AIRIX server to the AVM to confirm that the applicaiton has been registered or deregistered.

7.7.2 Structure
A registration confirmation package has the following structure (note that for DELETE types, the <INTERFACE>...</INTERFACE> section will not be included);

```
{wrapper tags}
<APPREGCONFIRM>
      <INTERFACE>
            interface definition
      </INTERFACE>
</APPREGCONFIRM>
{wrapper tags}
```

7.7.3 Tags

7.7.3.1 The <APPREGCONFIRM> tag
The <APPREGCONFIRM>...</APPREGCONFIRM> pair delimit the confirmation. The tag has the following attributes;

| Attribute | Optional? | Description |
|---|---|---|
| TYPE | No | This defines the type of parameter. It can take two values; ADD – this means that the application is to be added to the registration database DELETE – this means that the application is to be removed to the registration database |
| ID | Yes | The ID of the application being returned (if any) |

7.7.3.2 The <INTERFACE> tag
The <INTERFACE>...</INTERFACE> pair delimit the interface definition. The tag has the no attributes, and contains an interface definition as laid out in section 3. Note that instead of the <DEVICES>...</DEVICES> tags in section 3.1.3.6, it will be replaced by <SCREENS>...<SCREENS> with the screen definitions for only the one device that the interface is being sent to (see section 3.4.3.2 for the definition of the

FIG. 17KKK

Appendix "A"

<SCREENS> tag). This section will not be sent for APPREGCONFIRM messages of TYPE="DELETE".

7.7.4 Example
The following example shows the application confirmation with screen definitions for an application that allows a user to view their inbox and the mails in it.

```
{wrapper tags}
<APPREGCONFIRM TYPE="ADD" ID="12">
      <INTERFACE>
            <AXSCHDEF>
                  <EVENTS>
                        <EVENT>
                              (action definitions)
                        </EVENT>
                  </EVENTS>
                  <AXTDEFS>
                        (table definitions)
                  </AXTDEFS>
                  <DPACKETS>
                        (data package definitions)
                  </DPACKETS>

<SCREENS>
                        <SCREEN NAME="INBOX ">
                              {screen definition}
                        </SCREEN>
                        <SCREEN NAME="VIEWNEWMAIL">
                              {screen definition}
                        </SCREEN>
                  </SCREENS>
            </AXSCHDEF>
      </INTERFACE>
</APPREGCONFIRM>
{wrapper tags}
```

FIG. 17LLL

Appendix "A"

7.8 Setting the active device package

7.8.1 Description

If a user wishes to set the current device as their active device, the AVM must send a 'set active device' package to the AIRIX server

7.8.2 Structure

A 'set active device' package has the following structure;

```
{wrapper tags}
<SA>
{data}
</SA>
{wrapper tags}
```

7.8.3 Tags

7.8.3.1 The <SA> tag

The 'set active device' package is shown by the <SA>...</SA> tags. The tag has no attributes; the tag pair contains the user's username

7.8.4 Example

This package would be sent by a user with the username of 'scotty';

```
{wrapper tags}
<SA>scotty</SA>
{wrapper tags}
```

7.9 Set active device response

7.9.1 Description

This packages is sent back from the AIRIX server to the client in response to a request to set the current device as the active one.

7.9.2 Structure

A 'set active device response' package has the following structure;

```
{wrapper tags}
<SACONFIRM>
      <VALUE> {data} </VALUE>
</SACONFIRM>
```

FIG. 17MMM

Appendix "A"

{wrapper tags}

7.9.3 Tags

7.9.3.1 The <SACONFIRM> tag
The <SACONFIRM>...</SACONFIRM> pair delimit the confirmation. The tag does not have any attributes.

7.9.3.2 The <VALUE> tag
The <VALUE>...</VALUE> pair contains the status of the registration request. The following text strings are allowable;

CONFIRM – this means that the registration request was successful
NOTREGISTERED – this means that the registration request failed because

7.9.4 Example
This package would be sent by the AIRIX server to confirm a set active request;

```
{wrapper tags}
<SACONFIRM>
        <VALUE>CONFIRM</VALUE>
</SACONFIRM>
{wrapper tags}
```

7.10 Invalid Application package
7.10.1 Description
This package is sent back from the AIRIX server to the AVM in response to a request to interact with an application that is no longer registered with AIRIX.

7.10.2 Structure
An 'invalid application' package has the following structure;

```
{wrapper tags}
<NOAPP>
        <VALUE> {data} </VALUE>
</NOAPP>
{wrapper tags}
```

FIG. 17NNN

Appendix "A"

7.10.3 Tags

7.10.3.1 The <NOAPP> tag

The <NOAPP>...</NOAPP> pair delimit the confirmation. The tag has no attributes.

7.10.3.2 The <VALUE> tag

The <VALUE>...</VALUE> pair delimit the return code. It can only be NOAPPLICATION – Application not found.

7.10.4 Example

This package would be sent in response to a request if the application cannot be found;

```
{wrapper tags}
<NOAPP>
        <VALUE>NOAPPLICATION</VALUE>
</NOAPP>
{wrapper tags}
```

FIG. 17OOO

Appendix "A"

8 Application-server system interactions

The section that defines Application to server system interactions has been made obsolete by the document "AIRIX Polling XML Language Specification". It describes an XML-HTTP interface to AIRIX using POST and GET commands to a web-based ISAPI DLL.

FIG. 17PPP

12
DETERMINING OPERATIONAL STATUS OF A MOBILE DEVICE CAPABLE OF EXECUTING SERVER-SIDE APPLICATIONS

COPYRIGHT NOTICE

A portion of the disclosure of this patent document contains material which is subject to copyright protection. The copyright owner has no objection to the facsimile reproduction by any one of the patent document or patent disclosure, as it appears in a Patent Office patent file or records, but otherwise reserves all copyright rights whatsoever.

FIELD OF THE INVENTION

The present invention relates to software, devices and methods for determining the operational status of a mobile device capable of executing server-side applications.

BACKGROUND OF THE INVENTION

Wireless connectivity is a feature of the modern telecommunications environment. An increasing range of people are using a wide variety of wireless data networks to access corporate data applications.

However, there are numerous competing mobile devices (i.e. wireless computing devices) that can be used to achieve this. Each device has its own operating system and its own display characteristics. Operating systems are not mutually compatible, nor are the display characteristics—some are color, some are black and white, some are text-only, and some are pictorial.

At the same time, an increasing number of mobile device users are people without a technical background or high level of educational achievement. Such people are often intimidated by the need to run complex installation programs. Furthermore, at present, such installation programs generally depend on cable connections to a personal computer by the means of a 'cradle' or other such device.

U.S. Patent Publication No. US 2003/0060896, which is hereby incorporated by reference hereinto, discloses a mechanism allowing server-side applications to be presented at multiple wireless devices with minimal modification of the application at the server. As disclosed, the manner in which an application is presented at a mobile device is defined by a text based application definition file. The definition file describes how an application is to be presented at mobile device; the format of transactions over the wireless network; and a format of data related to the application to be stored at the mobile device. A virtual machine software component at the mobile device interprets the definition file and presents an interface to the application in accordance with the definition file. Conveniently, the application definition file may be independent of the particular type of mobile device, while virtual machine software components specific to the mobile device may be created.

The disclosed mechanism, while flexible, may have certain shortcomings. For example, in the event that an error occurs which interferes with normal application operation at the mobile device, which may manifest itself in the display of erroneous information at the mobile device or in the failure of the device to respond to stimuli, it may be difficult to ascertain whether the error is caused by the virtual machine software being used at the mobile device, a problem relating to the hardware at the mobile device (e.g. limited battery power or exhaustion of memory), or other problems. The user cannot not be relied upon to take steps to diagnose the problem at the mobile device because the user may lack the necessary technical expertise and because normal interaction with the device may be impossible.

Alternatively, it may simply be desirable to periodically assess the status of all or some of the mobile devices which are executing server-side applications, regardless of whether they are currently experiencing errors, e.g. in order to compile a list of which errors (if any) have occurred most recently or most frequently at the mobile devices, to determine how the mobile devices are being used, or for other purposes.

A solution addressing at least some of the above-noted shortcomings would be desirable.

SUMMARY OF THE INVENTION

To determine the operational status of a wireless communication device capable of executing server-side applications, a message is sent to the device requesting operational status of the device. The message may be may be triggered by a system administrator at a middleware server. The wireless communication device may receive the message, compose a response message indicative of the operational status of the device, and send the response message back to the middleware server. The messages may be extensible markup language (XML) messages. Composition of the response message may entail verifying that a textual operational status description forming part of the response message omits illegal XML characters, e.g., by passing the description through an XML formatter for removal of any illegal XML characters.

In one aspect of the present invention, there is provided a method of determining operational status of a wireless communication device capable of executing server-side applications, the method comprising: sending a message to said wireless communication device capable of executing server-side applications requesting operational status of the device; and receiving a response message from said wireless communication device indicative of the operational status of the device.

In another aspect of the present invention, there is provided a method of providing the operational status of a wireless communication device capable of executing server-side applications, the method comprising: receiving a message at said wireless communication device capable of executing server-side applications requesting operational status of the device, said receiving resulting in a received message; composing a response message from said wireless communication device indicative of the operational status of the device; and sending said response message from said wireless communication device to an originator of said received message.

In a further aspect of the present invention, there is provided a server comprising a processor and memory in communication with said processor storing machine-executable code adapting said server to: send a message to said wireless communication device capable of executing server-side applications requesting operational status of the device; and receive a response message from said wireless communication device indicative of the operational status of the device.

In a further aspect of the present invention, there is provided a wireless communication device comprising a processor and memory in communication with said processor storing machine-executable code adapting said device to: receive a message at said wireless communication device capable of executing server-side applications requesting operational status of the device, said receiving resulting in a received message; compose a response message from said wireless communication device indicative of the operational status of the device; and send said response message from said wireless communication device to an originator of said received message.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 schematically illustrates a mobile device, exemplary of an embodiment of the present invention, including virtual machine software, further exemplary of an embodiment of the present invention;

FIGS. 8-11 illustrate steps performed at a mobile device under control of virtual machine software of FIG. 2;

FIG. 14 illustrates the format of a response to a simple ping message which may be sent by a mobile device to a middleware server;

FIG. 16 illustrates the format of a response to a device statistics ping message which may be sent by a mobile device to a middleware server;

FIGS. 17A-17PPP contain Appendix "A" detailing example eXtensible Markup Language (XML) entities understood by the virtual machine software of the mobile device of FIG. 1.

DETAILED DESCRIPTION

Figure 1:
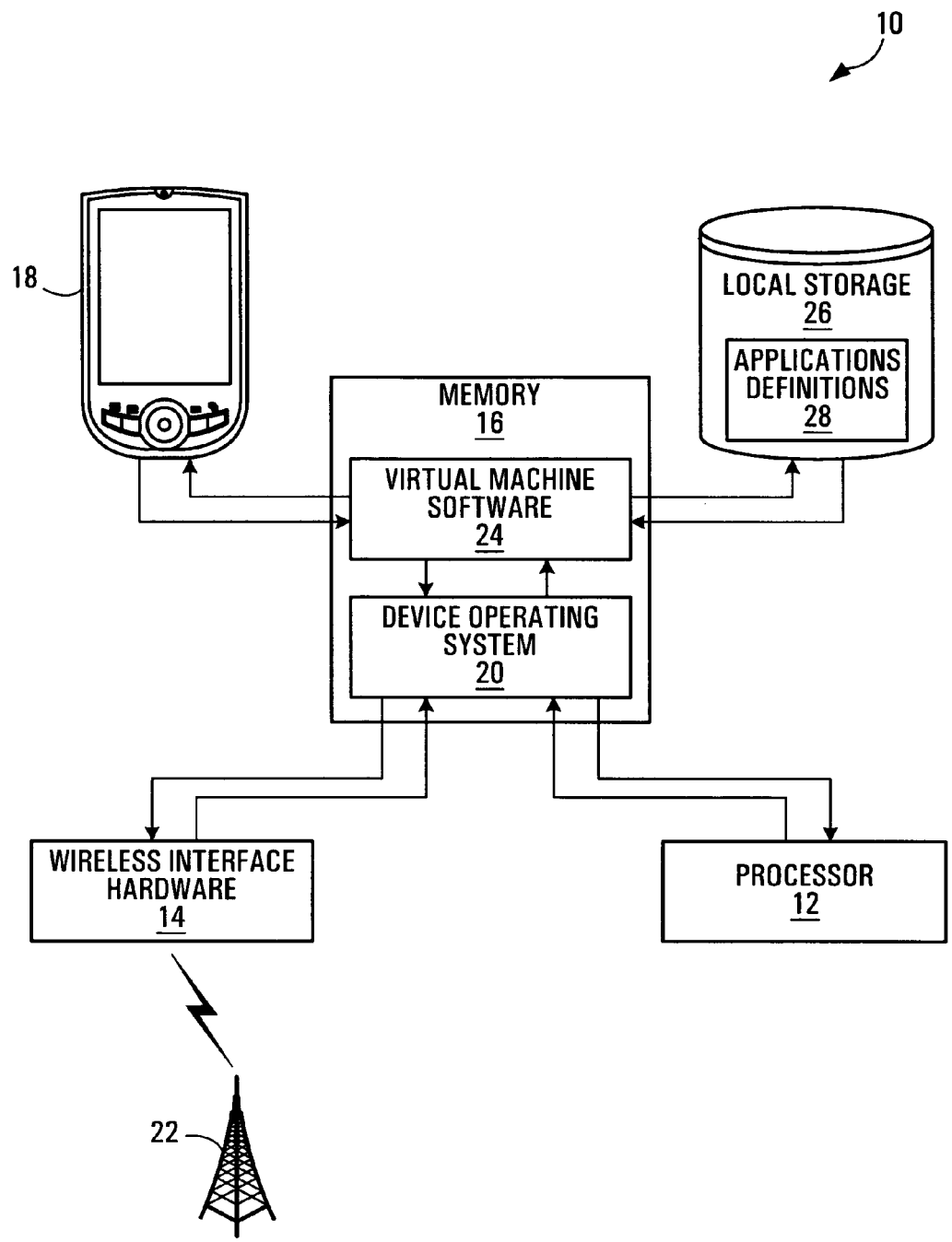

FIG. 1 illustrates a mobile device 10, exemplary of an embodiment of the present invention. Mobile device 10 may be any conventional mobile device, modified to function in manners exemplary of the present invention. As such, mobile device 10 includes a processor 12, in communication with a network interface 14, storage memory 16, and a user interface 18 typically including a keypad and/or touch-screen. Network interface 14 enables device 10 to transmit and receive data over a wireless network 22. Mobile device 10 may be, for example, be a Research in Motion (RIM) two-way paging device, a WinCE based device, a PalmOS device, a WAP enabled mobile telephone, or the like. Memory 16 of device 10 stores a mobile operating system such as the PalmOS, or WinCE operating system software 20. Operating system software 20 typically includes graphical user interface and network interface software having suitable application programmer interfaces ("API"s) for use by other applications executing at device 10.

Memory at device 10 further stores virtual machine software 24, exemplary of an embodiment of the present invention. Virtual machine software 24, when executed by mobile device 10, enables device 10 to present an interface for server side applications provided by a middleware server, described below. Specifically, virtual machine software 24 interprets a text application definition file defining a user interface 18 controlling application functionality, and the display format (including display flow) at device 10 for a particular server-side application; the format of data to be exchanged over the wireless network for the application; and the format of data to be stored locally at device 10 for the application. Virtual machine software 24 uses operating system 20 and associated APIs to interact with device 10, in accordance with the received application definition file. In this way, device 10 may present interfaces for a variety of applications, stored at a server. From the perspective of operating system 20, virtual machine software 24 is viewed as another application resident at device 10. Moreover, multiple wireless devices each having a similar virtual machine software 24 may use a common server side application in combination with an application definition, to present a user interface and program flow specifically adapted for the device.

As such, and as will become apparent, the exemplary virtual machine software 24 is specifically adapted to work with the particular mobile device 10. Thus if device 10 is a RIM Blackberry device, virtual machine software 24 is a RIM virtual machine. Similarly, if device 10 is a PalmOS or WinCE device, virtual machine software 24 would be a PalmOS or a WinCE virtual machine. As further illustrated in FIG. 1, virtual machine software 24 is capable of accessing local storage 26 at device 10.

As detailed below, an exemplary application definition file may be formed using a mark-up language, like XML. In accordance with an embodiment of the present invention, defined XML entities are understood by the virtual machine software 24. Defined XML entities are detailed in Appendix "A" hereto (the AIRIX Markup Language (ARML) Specification) and Appendix "A" of U.S. Patent Publication No. 2003/0060896. ARML is an XML markup language used in the present embodiment. The defined XML entities are interpreted by the virtual machine software 24, and may be used as building blocks to present server-side applications at mobile device 10, as detailed herein.

Figure 2:
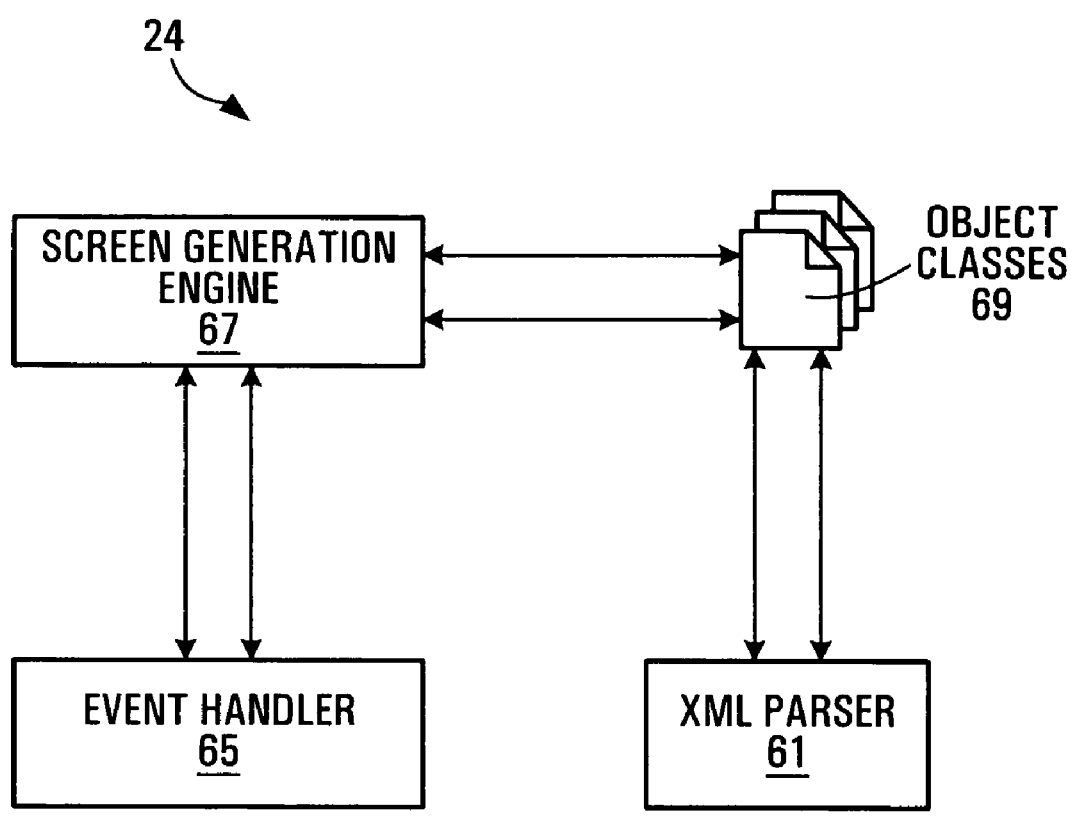
FIG. 2 further illustrates the organization of exemplary virtual machine software at the mobile device of FIG. 1.

Specifically, as illustrated in FIG. 2, virtual machine software 24 includes a conventional XML parser 61; an event handler 65; a screen generation engine 67; and object classes 69 corresponding to XML entities supported by the virtual machine software 24, and possibly contained within an application definition file 28. Supported XML entities are detailed in Appendix "A" hereto. A person of ordinary skill will readily appreciate that those XML entities identified in Appendix "A" are exemplary only, and may be extended, or shortened as desired.

XML parser 61 may be formed in accordance with the Document Object Model, or DOM, available at www.w3.org/DOM/ and being incorporated by reference hereinto. Parser 61 enables virtual machine software 24 to read an application definition file. Using the parser, the virtual machine software 24 may form a binary representation of the application definition file for storage at the mobile device, thereby eliminating the need to parse text each time an application is used. Parser 61 may convert each XML tag contained in the application definition file, and its associated data to tokens, for later processing. As will become apparent, this may avoid the need to repeatedly parse the text of an application definition file.

Screen generation engine 67 displays initial and subsequent screens at the mobile device, in accordance with an application definition 28, as detailed below.

Event handler 65, of virtual machine software 24 allows device 10 under control of virtual machine software 24 to react to certain external events. Example events include user interaction with presented screens or display elements, incoming messages received from a wireless network, or the like.

Object classes 69 also form part of virtual machine 24 and define objects that allow device 10 to process each of the supported XML entities at the mobile device. Each of object classes 69 includes attributes used to store parameters defined by the XML file, and functions allowing the XML entity to be processed at the mobile device, as detailed in Appendix "A", for each supported XML entity. So, as should be apparent, supported XML entities are extensible. Virtual machine software 24 may be expanded to support XML entities not detailed in Appendix "A". Corresponding object classes could be added to virtual machine software 24.

As detailed below, upon invocation of a particular application at mobile device 10, the virtual machine software 24 presents an initial screen based on the contents of the application definition 28 for the application. Screen elements are created by screen generation engine 67 by creating instances of corresponding object classes for defined elements, as contained within object classes 69. The object instances are created using attributes contained in the application definition file 28. Thereafter the event handler 65 of the virtual machine software 24 reacts to events for the application. Again, the event handler consults the contents of the application definition file for the application in order to properly react to events. Events may be reacted to by creating instances of associated "action" objects, from object classes 69 of virtual machine software 24.

Similarly, object classes 69 of virtual machine software 24 further include object classes corresponding to data tables and network transactions defined in the Table Definition and Package Definition sections of Appendix "A". At run time, instances of object classes corresponding to these classes are created and populated with parameters contained within application definition file, as required.

Using this general description, persons of ordinary skill in the art will be able to form virtual machine software 24 for any particular device. Typically, virtual machine software 24 may be formed using conventional object oriented programming techniques, and existing device libraries and APIs, as to function as detailed herein. As will be appreciated, the particular format of screen generation engine 67, object classes 69 will vary depending on the type of virtual machine software, its operating system and API available at the device. Once formed, a machine executable version of virtual machine software 24 may be loaded and stored at a mobile device, using conventional techniques. It can be embedded in ROM, loaded into RAM over a network, or from a computer readable medium.

Although, in the preferred embodiment the virtual machine software 24 and software forming object classes 29 are formed using object oriented structures, persons of ordinary skill will readily appreciate that other approaches could be used to form suitable virtual machine software. For example, object classes 69 forming part of the virtual machine could be replaced by equivalent functions, data structures or subroutines formed using a conventional (i.e. non-object oriented) programming environment. Operation of virtual machine software 24 under control of an application definition containing various XML definitions exemplified in Appendix "A" is further detailed below.

Figure 3:
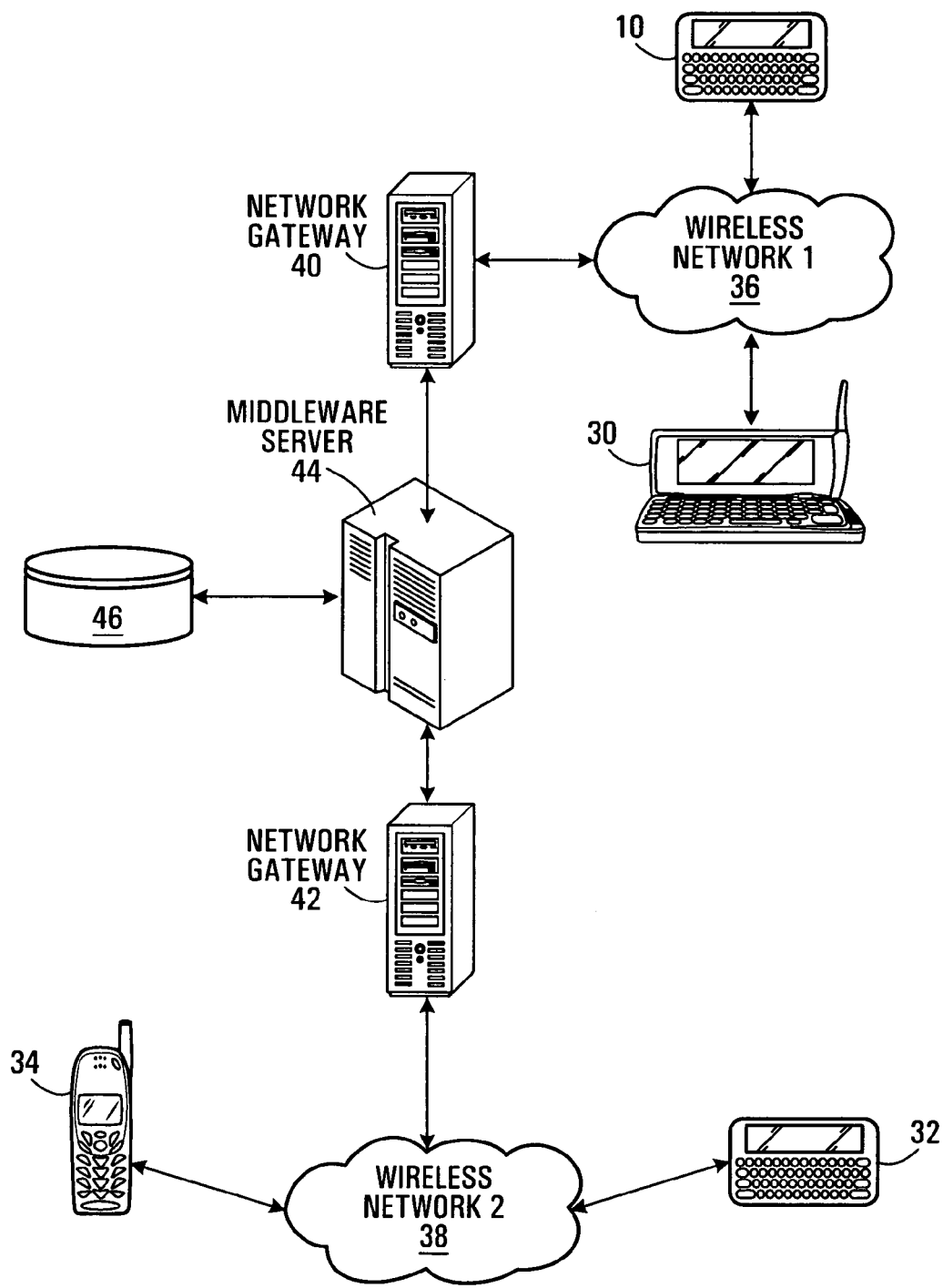
FIG. 3 illustrates an operating environment for the device of FIG. 1.

FIG. 3 illustrates the operating environment for a mobile device 10. Further example mobile devices 30, 32 and 34 are also illustrated in FIG. 3. These mobile devices 30, 32 and 34 are similar to device 10 and also store and execute virtual machine software exemplary of an embodiment of the present invention.

Virtual machine software like that stored at device 10, executes on each mobile device 10, 30, 32, 34, and communicates with a middleware server 44 by way of example wireless networks 36 and 38 and network gateways 40 and 42. Example gateways 40 and 42 are generally available as a service for those people wishing to have data access to wireless networks. Wireless networks 36 and 38 are further connected to one or more computer data networks, such as the Internet and/or private data networks by way of gateway 40 or 42. As will be appreciated, the invention may work with many types of wireless networks. Middleware server 44 is in turn in communication with a data network, that is in communication with wireless network 36 and 38. The communication used for such communication is via TCP/IP over an HTTP transport. As could be appreciated, other network protocols such as X.25 or SNA could equally be used for this purpose.

At least three categories of communication between middleware server 44 and mobile devices 10, 30, 32 and 34 exist. First, virtual machine software 24 at each device may query middleware server 44 for a list of applications that a user of an associated mobile device 10, 30, 32 or 34 can make use of. If a user decides to use a particular application, device 10, 30, 32 or 34 can download a text description, in the form of an application definition file, for the application from the middleware server 44 over its wireless interface. As noted, the text description is preferably formatted using XML. Second, virtual machine software 24 may send, receive, present, and locally store data related to the execution of applications, or its own internal operations. The format of exchanged data for each application is defined by an associated application definition file. Again, the exchanged data is formatted using XML, in accordance with the application definition file. Third, middleware server 44 may query a mobile device as to its operational status, either for purposes of diagnosing a reported problem at the device or simply to collect mobile device operational status statistics. As will become apparent, it is the third category of communication which is the focus of the present application.

Middleware server 44 stores text application definition files for those applications that have been enabled to work with the various devices 10, 30, 32, and 34 using virtual machine software 24 in a pre-defined format understood by virtual machine software 24. Software providing the functions of the middleware server 44, in the exemplary embodiment is written in C#, using SQL Server or MySQL database.

As noted, text files defining application definitions and data may be formatted in XML. For example XML version 1.0, detailed in the XML version 1.0 specification third edition and available at www.w3.org/TR/2004/REC-xml-20040404, may be used. However, as will be appreciated by those of ordinary skill in the art, the functionality of storing XML description files is not dependent on the use of any given programming language or database system.

Each application definition file is formatted according to defined rules and uses pre-determined XML mark-up tags known by both virtual machine software 24, and complementary middleware server software 68. That is, each application definition file 26 is an XML data instance file which conforms to a predefined XML schema designed to support the execution of server-side applications at various types of mobile devices. Tags define XML entities used as building blocks to present an application at a mobile device. Knowledge of these rules, and an understanding of how each tag and section of text should be interpreted, allows virtual machine software 24 to process an XML application definition and thereafter execute an application, as described below. Virtual machine software 24 effectively acts as an interpreter for a given application definition file.

Figure 4:
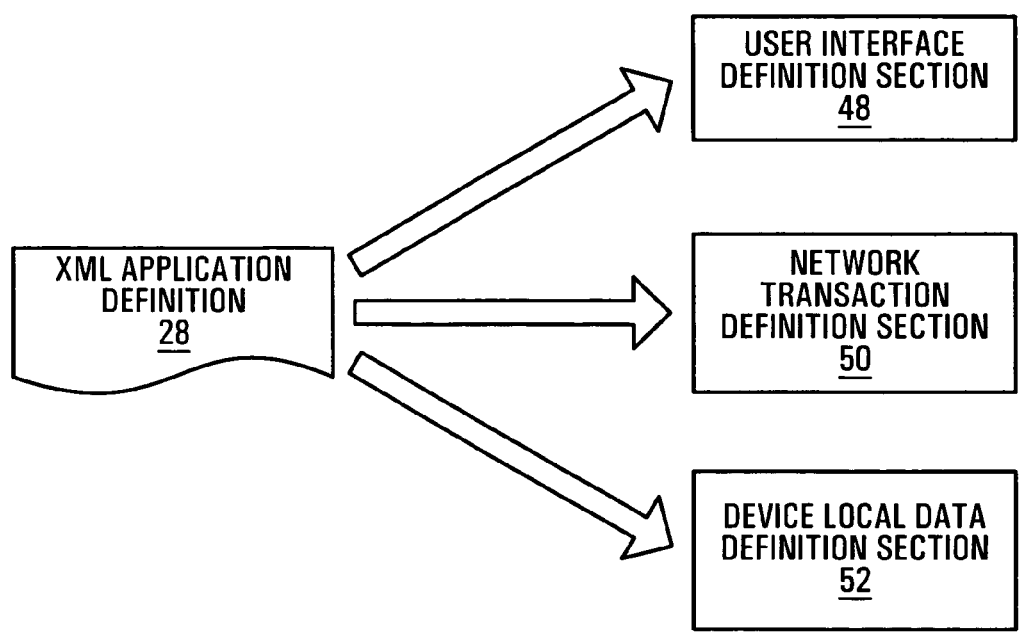
FIG. 4 illustrates the structure of example application definitions stored at a server of FIG. 2 used by the device of FIG. 1.

FIG. 4 illustrates an example format for an XML application definition file 28. As illustrated, the example application definition file 28 for a given device and application includes three components: a user interface definition section 48, specific to the user interface for the device 10, which defines the format of screen or screens for the application and how the user interacts with them and contains application flow control events and actions; a network transactions definition section 50 defining the format of data to be exchanged with the application; and a local data definition section 52 defining the format of data to be stored locally on the mobile device by the application.

Defined XML mark-up tags correspond to XML entities supported at a device, and are used to create an application definition file 28. The defined tags may broadly be classified into three categories, corresponding to the three sections 48, 50 and 52 of an application definition file 28.

Example XML tags and their corresponding significance are detailed in Appendix "A". As noted above, virtual machine software 24 at a mobile device includes object classes corresponding to each of the XML tags. At run time, instances of the objects are created as required.

Broadly, the following list includes example XML tags (i.e. XML elements) which may be used to define the user interface definition:

SCREEN—this defines a screen. A SCREEN tag pair contains the definitions of the user interface elements (buttons, radio buttons, and the like) and the events associated with the screen and its elements BUTTON—this tag defines a button and its associated attributes LIST—this tag defines a list box CHOICEBOX—this tag defines a choice item, that allows selection of a value from predefined list MENU—the application developer will use this tag to define a menu for a given screen EDITBOX—this tag defines an edit box TEXT ITEM—this tag describes a text label that is displayed CHECKBOX—this tag describes a checkbox HELP—this tag can define a help topic that is used by another element on the screen IMAGE—this tag describes an image that appears on those displays that support images ICON—this tag describes an icon EVENT—this defines an event to be processed by the virtual machine software. Events can be defined against the application as a whole, individual screens or individual items on a given screen. Sample events would be receipt of data over the wireless interface, or a edit of text in an edit box ACTION—this describes a particular action that might be associated with an event handler. Sample actions would be navigating to a new window or displaying a message box.

The second category of example XML tags describes the network transaction section 50 of application definition 28. These may include the following example XML tags:

TABLEUPDATE—using this tag, the application developer can define an update that is performed to a table in the device's local storage. Attributes allow the update to be performed against multiple rows in a given table at once;

PACKAGEFIELD—this tag is used to define a field in a data package that passes over the wireless interface The third category of XML tags used to describe an application are those used to define a logical database that may be stored at the mobile device. The tags available that may be used in this section are:

TABLE—this tag, and its attributes, define a table. Contained within a pair of TABLE tags are definitions of the fields contained in that table. The attributes of a table control such standard relational database functions as the primary key for the table.

FIELD—this tag describes a field and its attributes. Attributes of a field are those found in a standard relational database system, such as the data type, whether the field relates to one in a different table, the need to index the field, and so on.

In addition to these XML tags, virtual machine software 24 may, from time to time, need to perform certain administrative functions on behalf of a user. In order to do this, one of object classes 69 has its own repertoire of tags to intercommunicate with the middleware server 44. Such tags differ from the previous three groupings in that they do not form part of an application definition file, but are solely used for administrative communications between the virtual machine software 24 and the middleware server 44. Data packages using these tags are composed and sent due to user interactions with the virtual machine's configuration screens. The tags used for this include:

REG—this allows the application to register and deregister a user for use with the middleware server FINDAPPS—by using this operation, users can interrogate the server for the list of applications that are available to them APP REG—using this operation, the end-user can register (or deregister) for an application and have the application interface downloaded automatically to their device (or remove the interface description from the device's local storage).

SETACTIVE—If the user's preferred device is malfunctioning, or out of power or coverage, they will need a mechanism to tell the Server to attempt delivery to a different device. The SETACTIVE command allows the user to set the device that they are currently using as their active one PING—this XML element is used by the middleware server 44 to query a mobile device as to its operational status. It is described in greater detail later in the application.

Figure 5:
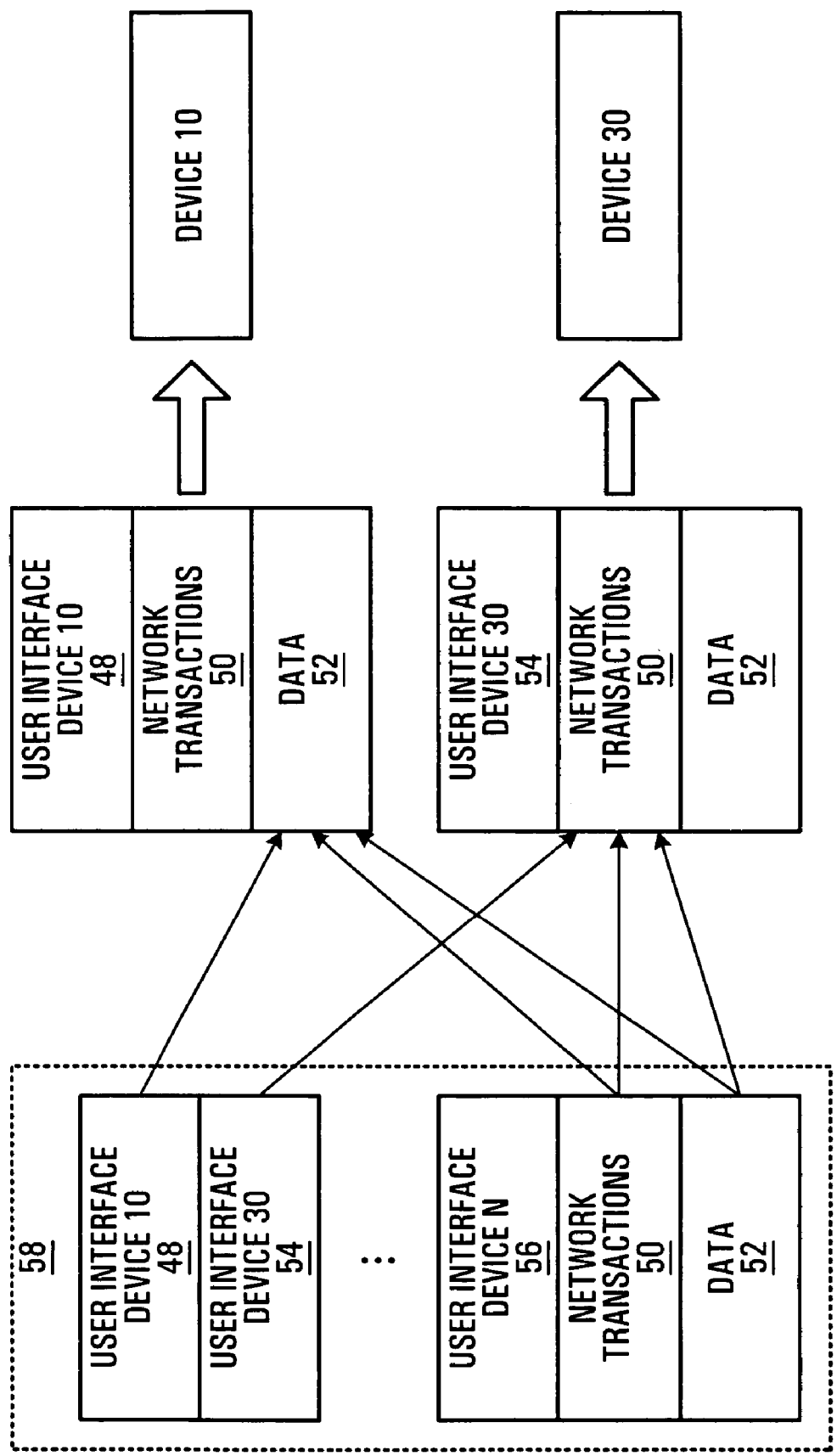
FIG. 5 schematically illustrates the formation of application definition files at a middleware server of FIG. 2.

Referring again generally to the manner in which execution of server-based applications at mobile devices is facilitated, FIG. 5 illustrates the organization of application definitions at middleware server 44 and how middleware server 44 may form an application definition file 28 (FIG. 4) for a given device 10, 30, 32 or 34. In the illustration of FIG. 5, only two mobile devices 10 and 30 are considered. Typically, since network transactions and local data are the same across devices, the only piece of the application definition that varies for different devices is the user interface definition.

So, middleware server 44 stores a master definition 58 for a given server side application. This master definition 58 contains example user interface descriptions 48, 54, 56 for each possible type of mobile device 10, 30, 32; descriptions of the network transactions 50 that are possible and data descriptions 52 of the data to be stored locally on the mobile device. Preferably, the network transactions 50 and data descriptions 52 will be the same for all mobile devices 10, 30 and 32.

For device 10, middleware server 44 composes an application definition file 28 by querying the device type and adding an appropriate user interface description 48 for device 10 to the definitions for the network transactions 50 and the data 52. For device 30, middleware server 44 composes the application definition by adding the user interface description 54 for device 10 to the definitions for the network transactions 50 and data 52.

Figure 6:
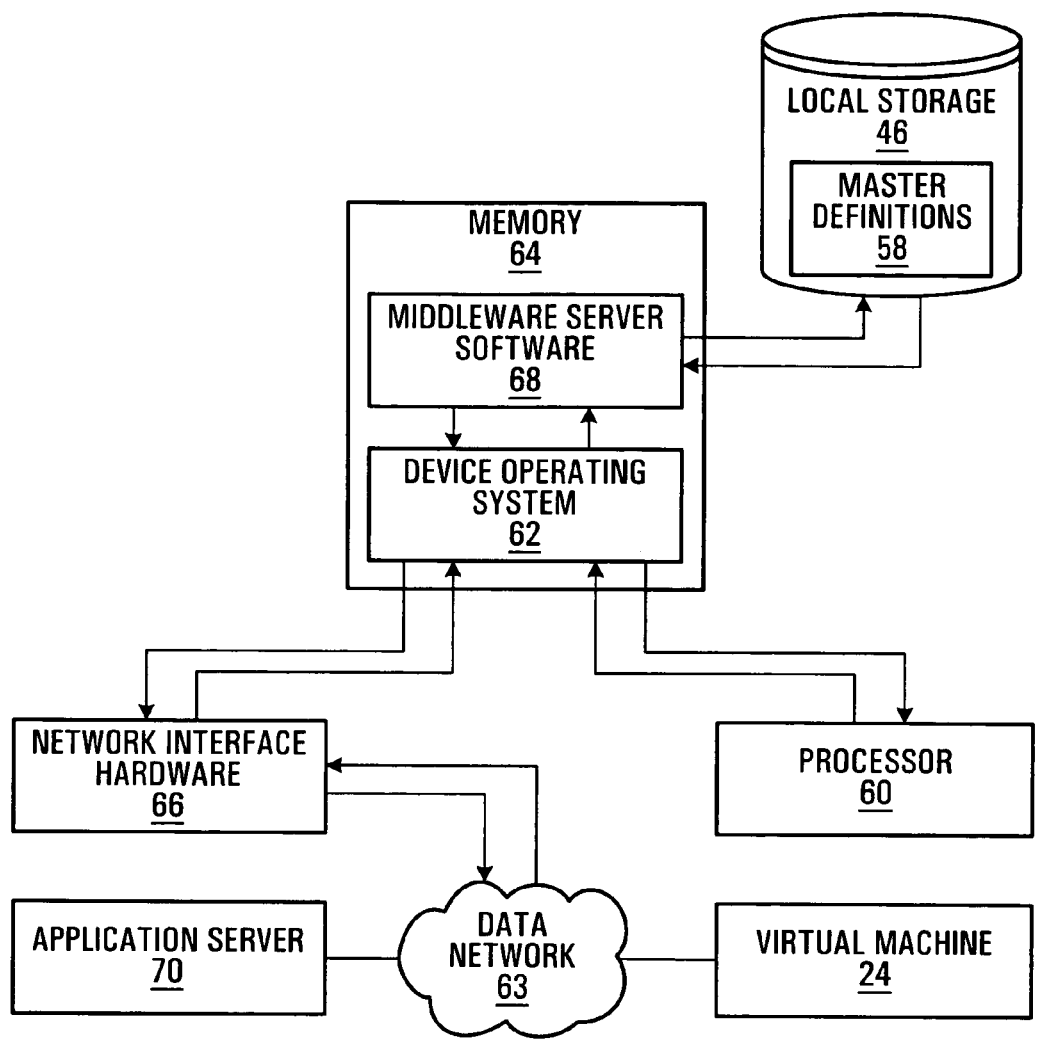
FIG. 6 schematically illustrates the middleware server of FIG. 2, exemplary of an embodiment of the present invention, including an application definitions database, further exemplary of an embodiment of the present invention.

The master definition 58 for a given application is created away from the middleware server and loaded onto the middleware server by administrative staff charged with its operation. Master definition files could be created either by use of a simple text editor, or by a graphical file generation tool. Such a tool might generate part or all of the file, using knowledge of the XML formatting rules, based on the user's interaction with screen painters, graphical data definition tools and the like. It will be appreciated that the master definition file 58 is an XML data instance which conforms to a predefined XML schema referenced above FIG. 6 illustrates the organization of middleware server 44 and associated master definitions. Middleware server 44 may be any conventional application server, modified to function in manners exemplary of the present invention. As such, middleware server 44 includes a processor 60, in communication with a network interface 66 and storage memory 64. Middleware server 44 may be, for example, a Windows 2000 server, a Sun Solaris server, or the like. Memory of middleware server 44 stores an operating system such as Windows 2000, or Solaris operating system software 62.

Network interface 66 enables middleware server 44 to transmit and receive data over a data network 63. Transmissions are used to communicate with both the virtual machine software 24 (via the wireless networks 36, 38 and wireless gateways 40,42) and one or more application servers, such as application server 70, that are the end recipients of data sent from the mobile client applications and the generators of data that is sent to the mobile client applications.

Memory at middleware server 44 further stores software 68, exemplary of an embodiment of the present invention. Middleware server software 68, when executed by middleware server 44 enables the middleware server to understand and compose XML data packages that are sent and received by the middleware server. These packages may be exchanged between middleware server 44 and the virtual machine software 24, or between the middleware server 44 and the application server 70. Middleware server software 68 may be loaded from a machine-readable medium.

As described above, communication between the application server 70 and the middleware server 44 can, in an exemplary embodiment, use HTTP running on top of a standard TCP/IP stack; however this is not a requirement. An HTTP connection between a running application at the application server 70 and the middleware server 44 is established in response to the application at a mobile device presenting the application. The server side application provides output to middleware server 44 over this connection. The server side application data is formatted into appropriate XML data packages understood by the virtual machine software 24 at a mobile device by the server side application.

That is, a server side application (or an interface portion of the application) formats application output into XML in a manner consistent with the format defined by the application definition file for the application. Alternatively, an interface component separate from the application could easily be formed with an understanding of the format and output for a particular application. That is, with a knowledge of the format of data provided and expected by an application at application server 70, an interface component could be a produced using techniques readily understood by those of ordinary skill. The interface portion could translate application output to XML, as expected by middleware server 44. Similarly, the interface portion may translate XML input from a mobile device into a format understood by the server side application.

The particular identity of the mobile device on which the application is to be presented may be identified by a suitable identifier, in the form of a header contained in the server side application output. This header may be used by middleware server 44 to forward the data to the appropriate mobile device. Alternatively, the identity of the connection could be used to forward the data to the appropriate mobile device.

Figure 7:
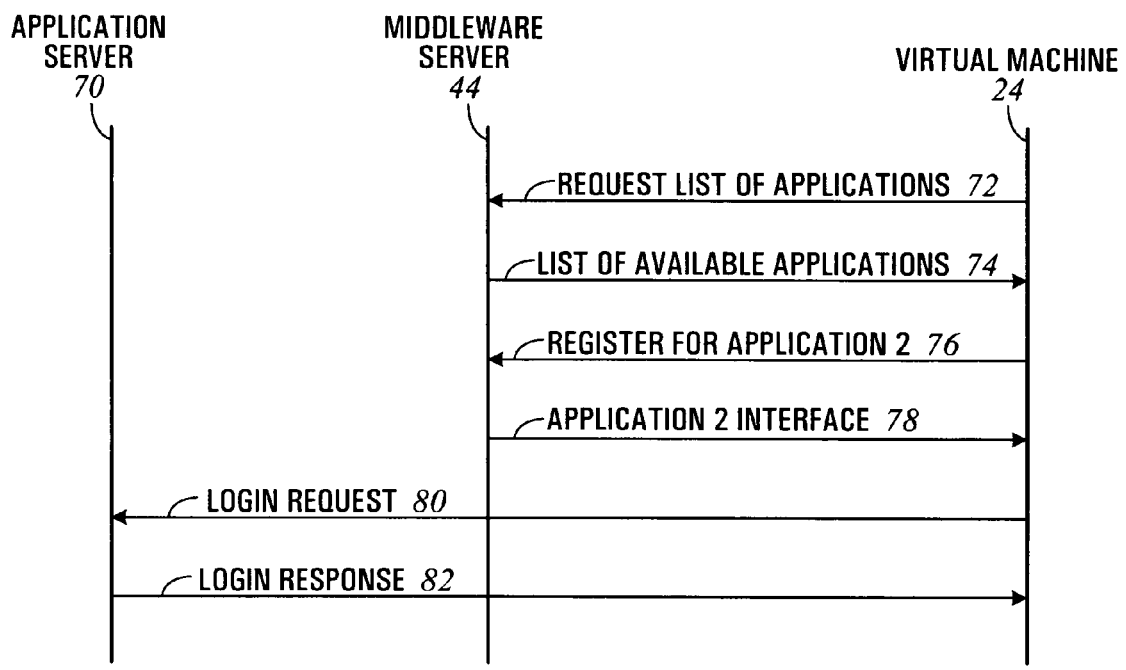
FIG. 7 is a flow diagram illustrating the exchange of sample messages passed between a mobile device, middleware server and application server of FIG. 2.

FIG. 7 illustrates a sequence diagram detailing data (application data or application definition files 28) flow between mobile device 10 and middleware server 44, in manners exemplary of an embodiment of the present invention.

For data requested from middleware server 44, device 10, under software control by virtual machine software 24 makes requests to middleware server 44 (also illustrated in FIG. 2), which passes over the wireless network 36 through network gateway 40. Network gateway 40 passes the request to the middleware server 44. Middleware server 44 responds by executing a database query on its database 46 that finds which applications are available to the user and the user's mobile device. For data passed from middleware server 44 to device 10, data is routed through network gateway 40. Network gateway 40 forwards the information to the user's mobile device over the wireless network 36.

FIG. 7 when considered with FIG. 3 illustrates a sequence of communications between device 10, and middleware server 44 that may occur when the user of a mobile device wishes to download an application definition file 28 for a server side application.

So, initially, device 10 interrogates server 44 to determine which applications are available for the particular mobile device being used. This may be accomplished by the user instructing the virtual machine software 24 at device 10 to interrogate the server 44. Responsive to these instructions the virtual machine software 24 sends an XML message to the server requesting the list of applications (data flow 72); as illustrated in FIG. 7 the XML message may contain the <FINDAPPS> tag, signifying to the middleware server 44, its desire for a list available application. In response, middleware server 44 makes a query to database 46. Database 46, responsive to this query, returns a list of applications that are available to the user and the mobile device. The list is typically based, at least in part, on the type of mobile device making the request, and the applications known to middleware server 44. Middleware server 44 converts this list to an XML message and sends to the virtual machine (data flow 74). Again, a suitable XML tag identifies the message as containing the list of available applications.

In response, a user at device 10 may choose to register for an available server side application. When a user chooses to register for an application, virtual machine software 24 at device 10 composes and sends an XML registration request for a selected application (data flow 76) to middleware server 44. As illustrated in FIG. 11, an XML message containing a <REG> tag is sent to middleware server 44. The name of the application is specified in the message. The middleware server 44, in response, queries its database for the user interface definition for the selected application for the user's mobile device. Thereafter, the middleware server creates the application definition file, as detailed with reference to FIG. 5. Then, middleware server 44 sends to the mobile device (data flow 78—FIG. 7) the created application definition file 28.

The user is then able to use the functionality defined by the interface description to send and receive data.

At this time, parser 61 of virtual machine software 24 may parse the XML text of the application definition file to form a tokenized version of the file. That is, each XML tag may be converted a defined token for compact storage, and to minimize repeated parsing of the XML text file. The tokenized version of the application definition file may be stored for immediate or later use by device 10. In this context, the term "tokenized" may refer to placement of the XML structure into binary objects, which is much like conversion of a script into byte code.

Thereafter, upon invocation of a particular application for which the device 10 has registered, the screen generation engine 67 of the virtual machine software 24 at the device causes the virtual device to locate the definition of an initial screen for that application. The initial screen is identified within the application definition file 28 for that application using a <SCREEN> tag, and an associated attribute of <First screen="yes">.

Figure 8:
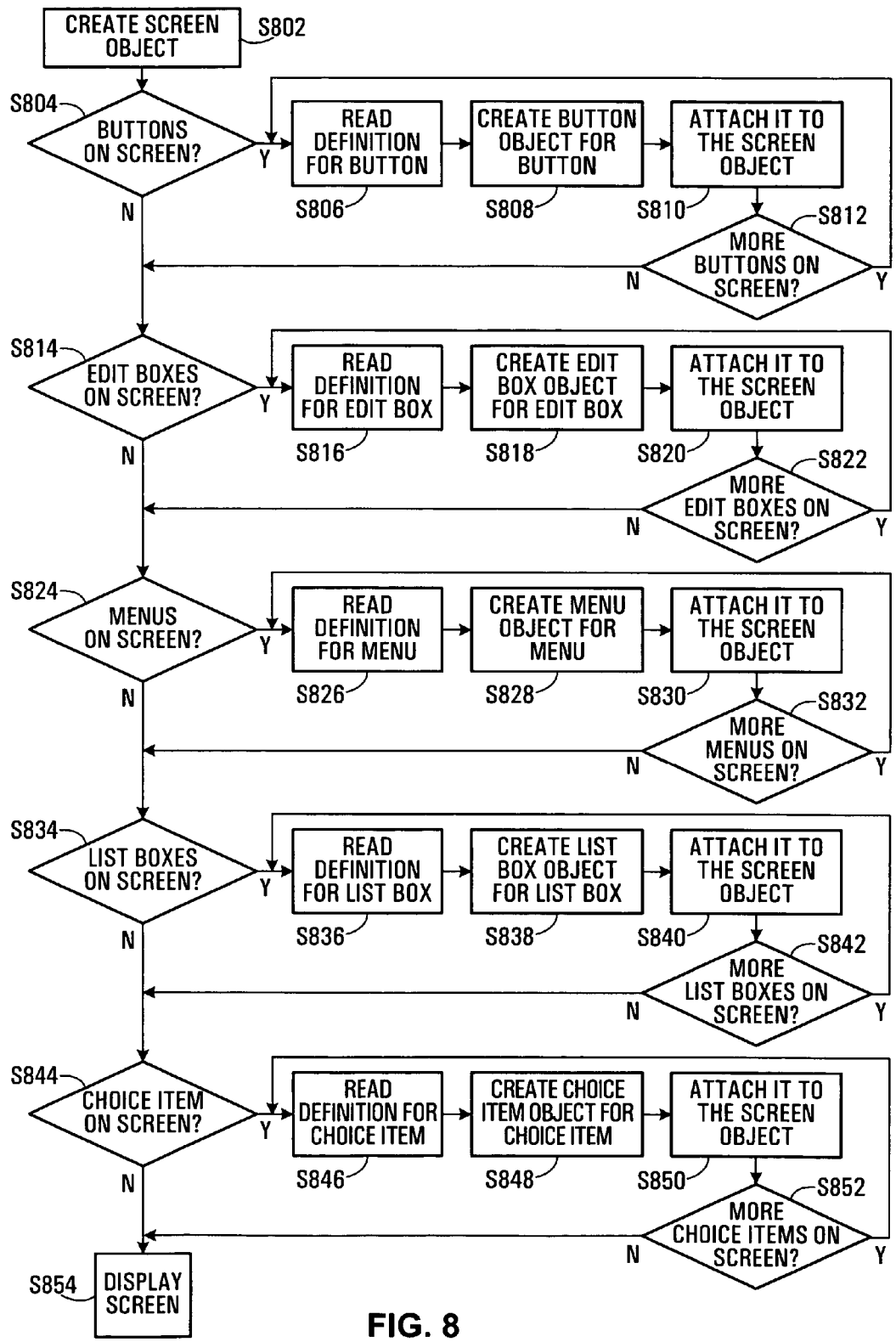

Steps performed by virtual machine software 24 in processing a first or subsequent screen are illustrated in FIG. 8. As illustrated, screen generation engine 67, generates an instance of an object class, defining a screen by parsing the section of the XML application definition file corresponding to the <SCREEN> tag in step S802. Supported screen elements may be buttons, edit boxes, menus, list boxes, and choice items, as identified in Appendix "A". Other screen elements, such as images and checkboxes, as detailed in Appendix "A" may also be supported. For clarity of illustration, their processing by screen generation engine 67 however, is not detailed. Each supported tag under the SCREEN definition section, in turn causes creation of instances of object classes within the virtual machine software 24. Typically, instances of objects corresponding to the tags, used for creation of a screen, result in presentation of data at mobile device 10. As well the creation of such objects may give rise to events (e.g. user interaction) and actions to be processed at device 10.

Figure 9:
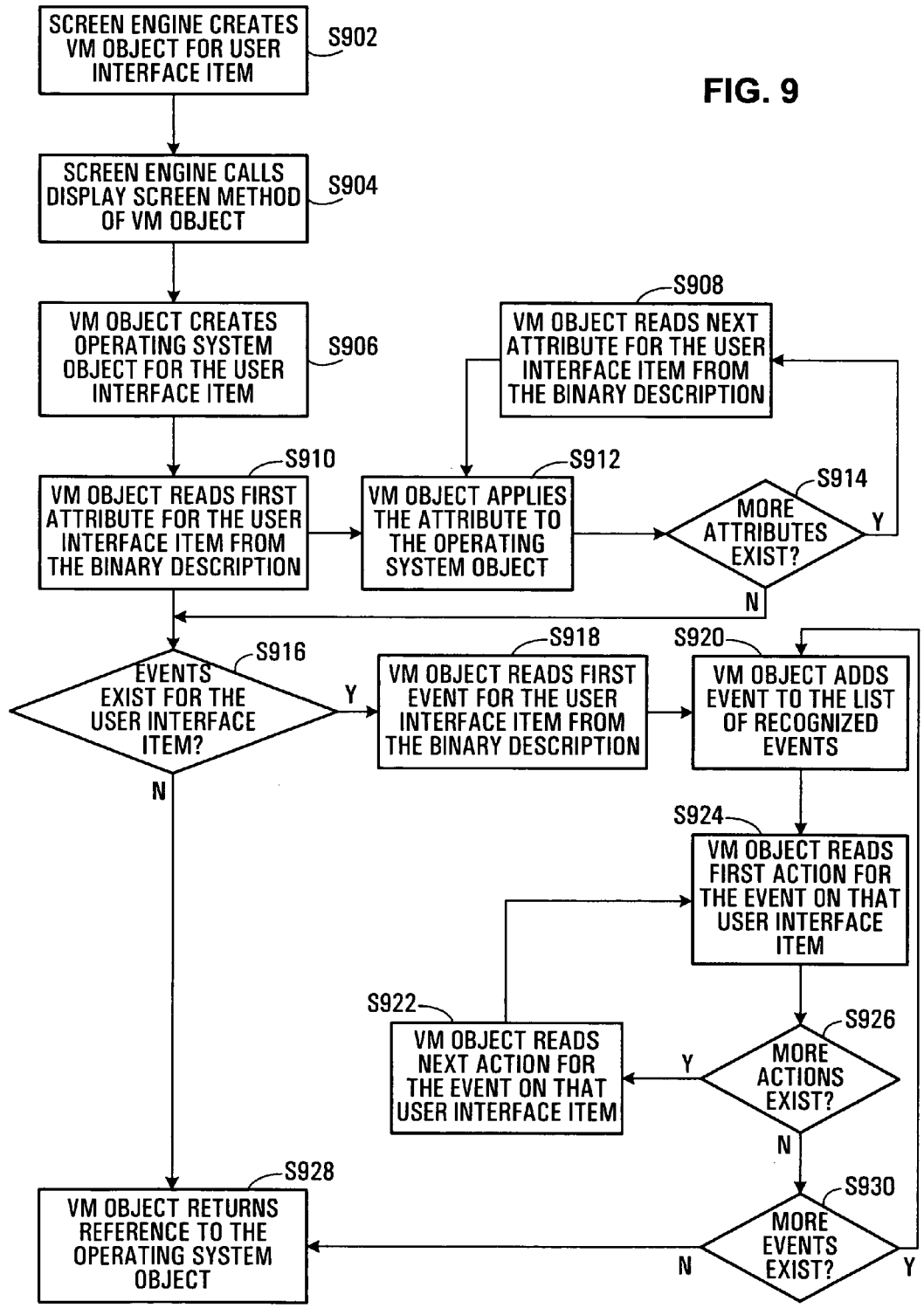

Each element definition causes virtual machine software 24 to use the operating system of the mobile device to create corresponding display element of a graphical user interface as more particularly illustrated in FIG. 9. Specifically, for each element, the associated XML definition is read in step S806, S816, S826, S836, and S846, and a corresponding instance of a screen object defined as part of the virtual machine software 24 is created by the virtual machine software 24 in steps S808, S818, S828, S838 and S848, in accordance with steps S902 and onward illustrated in FIG. 9. Each interface object instance is created in step S902. Each instance takes as attribute values defined by the XML text associated with the element. A method of the virtual machine object is further called in step S904, and causes a corresponding device operating system object to be created. Those attributes defined in the XML text file, stored within the virtual machine object instance are applied to the corresponding instance of a display object created using the device operating system in steps S908S-S914. These steps are repeated for all attributes of the virtual machine object instance. For any element allowing user interaction, giving rise to an operating system event, the event handler 65 of virtual machine software 24 is registered to process operating system events, as detailed below.

Additionally, for each event (as identified by an <EVENT> tag) and action (as identified by an <ACTION> tag) associated with each XML element, virtual machine software 24 creates an instance of a corresponding event and action object forming part of virtual machine software 24. Virtual machine software 24 further maintains a list identifying each instance of each event and action object, and an associated identifier of an event in steps S916 to S928.

Steps S902-S930 are repeated for each element of the screen in steps S808, S818, S828, S838 and S848 as illustrated in FIG. 8. All elements between the <SCREEN> definition tags are so processed. After the entire screen has been so created in memory, it is displayed in step S854, using conventional techniques.

As will be appreciated, objects are specific to the type of device executing the virtual machine software 24. Functions initiated as a result of the XML description may require event handling. This event handling is processed by event handler 65 of virtual machine software 24 in accordance with the application definition file 28. Similarly, receipt of data from a mobile network will give rise to events. Event handler 65, associated with a particular application presented at the device similarly processes incoming messages for that particular application. In response to the events, virtual machine software 24 creates instance of software objects, and calls functions of those object instances, as required by the definitions contained within the XML definitions contained within the application definition file 28, giving rise to the event.

As noted, the virtual machine software 24 includes object classes, allowing the virtual machine to create object instances corresponding to an <EVENT> tag. The event object classes includes methods specific to the mobile device that allow the device to process each of the defined XML descriptions contained within the application definition file, and also to process program/event flow resulting from the processing of each XML description.

Figure 10:
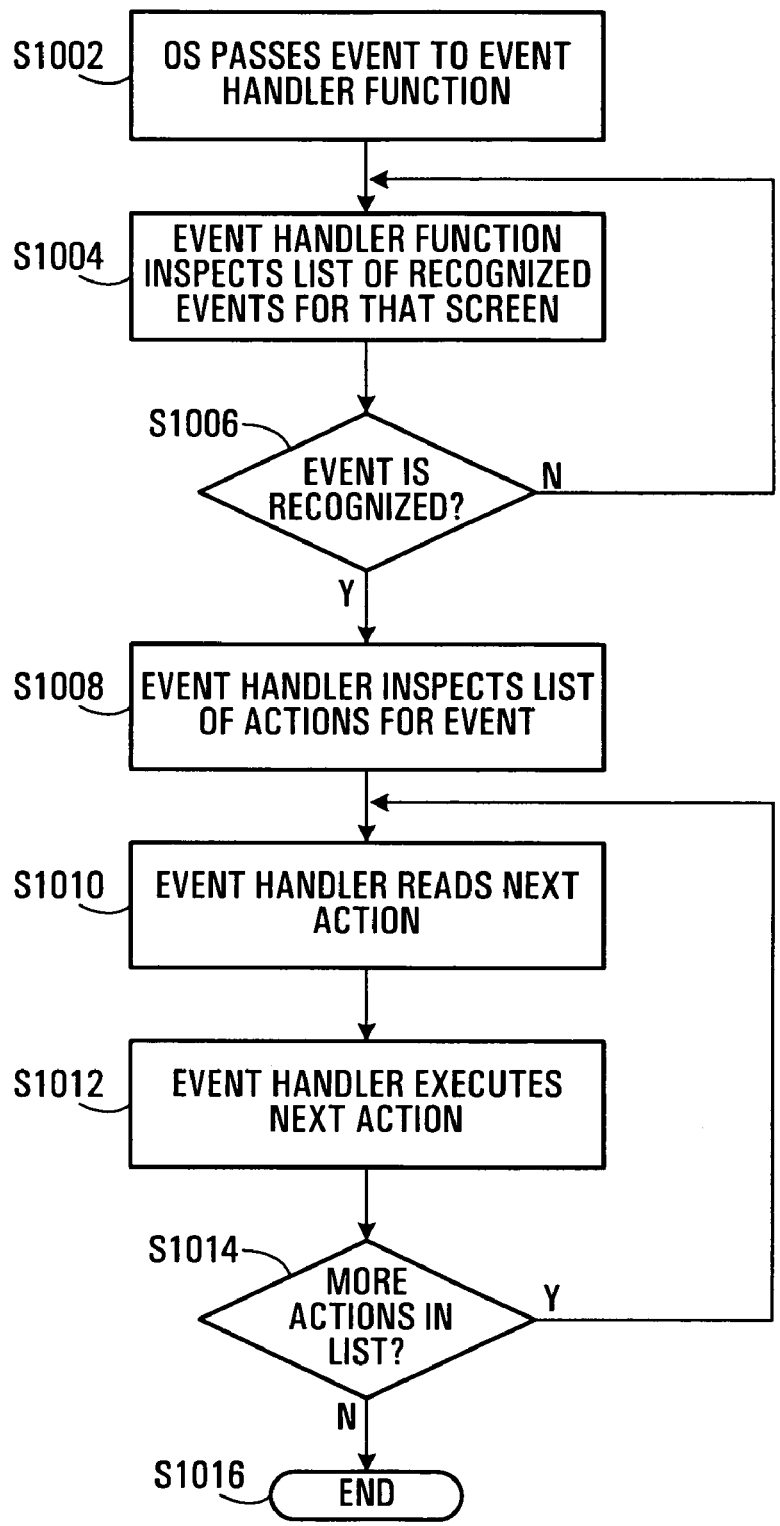

Events may be handled by virtual machine software 24 as illustrated in FIG. 10. Specifically, as device handler 65 has been registered with the operating system for created objects, upon occurrence of an event, steps S1002 and onward are performed in response to the operating system detecting an event.

An identifier of the event is passed to event handler 65 in step S1002. In steps S1004-S1008, this identifier is compared to the known list of events, created as a result of steps S916-S930. For an identified event, actions associated with that event are processed in step S1008-S1014.

That is, virtual machine software 24 performs the action defined as a result of the <ACTION> tag associated with the <EVENT> tag corresponding to the event giving rise to processing by the event handler 65. The <ACTION> may cause creation of a new screen, as defined by a screen tag, a network transmission, a local storage, or the like.

New screens, in turn, are created by invocation of the screen generation engine 61, as detailed in FIGS. 8 and 9. In this manner the navigation through the screens of the application is accomplished according to the definition embodied in the XML application definition.

Similarly, when the user wishes to communicate with the middleware server, or store data locally, event handler 65 creates instances of corresponding object classes within the object classes 69 of virtual machine software 24 and calls their methods to store or transmit the data using the local device operating system. The format of data is defined by the device local definition section 52; the format of network packages is defined in the network transaction package definition section 50.

For example, data that is to be sent to the wireless network is assembled into the correct XML packages using methods within an XML builder object, formed as a result of creating an instance of a corresponding object class within object classes 69 of virtual machine software 24. Methods of the XML builder object create a full XML package before passing the completed XML package to another message server object. The message server object uses the device's network APIs to transmits the assembled data package across the wireless network.

Received XML data packages from network 63 (FIG. 2) give rise to events processed by event handler 65. Processing of the receipt of data packages is not specifically illustrated in FIG. 9. However, the receipt of data triggers a "data" event of the mobile device's operating system. This data event is passed to the virtual machine, and event handler 65 inspects the package received. As long as the data received is a valid XML data package as contained within the application definition, the virtual machine inspects the list of recognised XML entities.

So, for example, a user could send a login request 80 by interacting with an initial login screen, defined in the application definition file for the application. This would be passed by the middleware server 44 to the backend application server 70. The backend application server according to the logic embedded within its application, would return a response, which the middleware server 44 would pass to the virtual machine software 24. Other applications, running on the same or other application servers might involve different interactions, the nature of such interactions being based upon the functionality and logic embedded within the application server 70.

Figure 12:
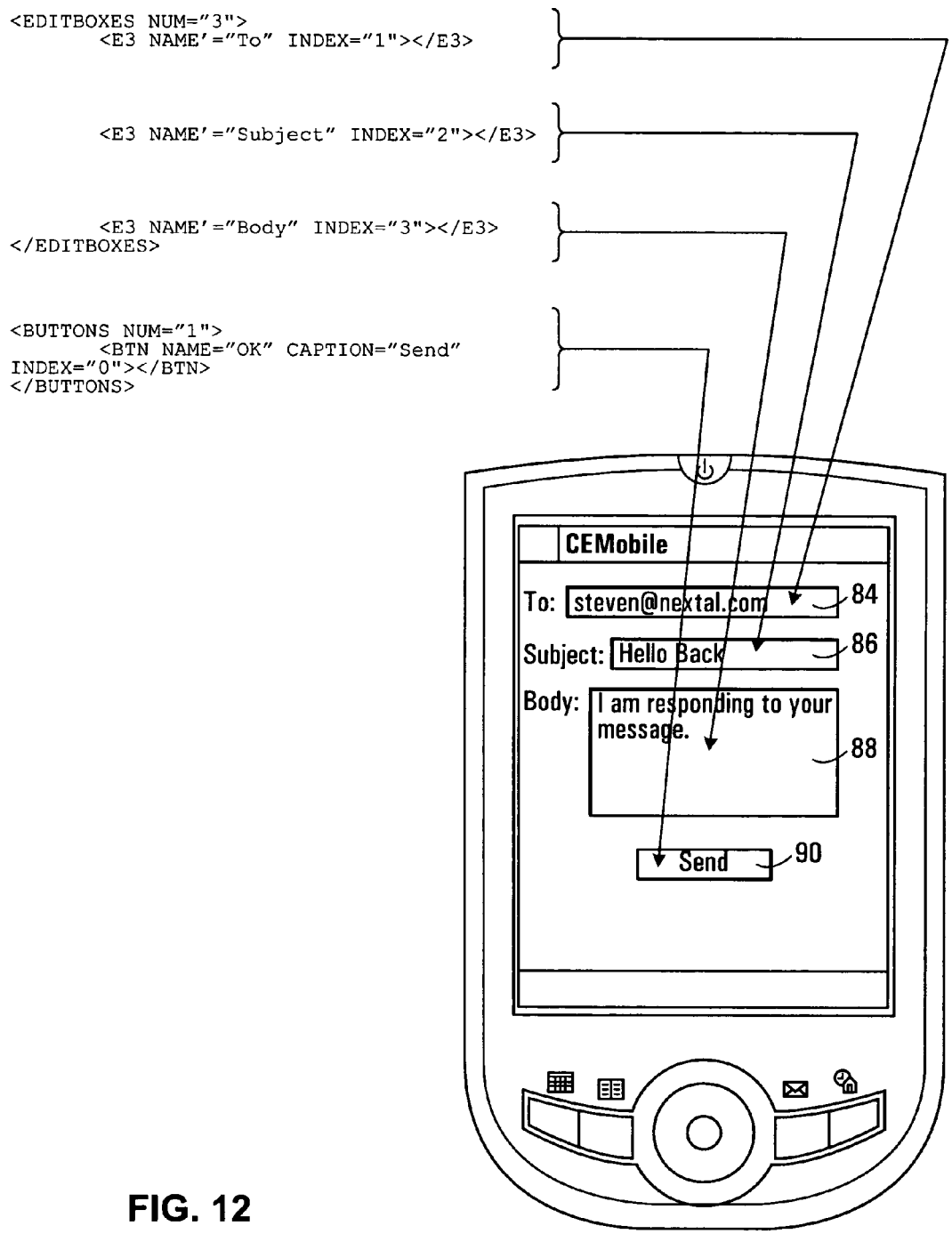
FIG. 12 illustrates the format of messages exchanged in the message flow of FIG. 7.

FIG. 12 illustrates sample XML messages passed as the result of message flows illustrated in FIG. 6. For each message, the header portion, between the <HEAD> . . . </HEAD> tags contains a timestamp and the identifier of the sending device.

Example message 72 is sent by the mobile device to request the list of applications that the server has available to that user on that device. It specifies the type of device by a text ID contained between the <PLATFORM> . . . </PLATFORM> tags. Example message 74 is sent in response to message 70 by middleware server 44 to the mobile device 10. It contains a set of <APP> . . . </APP> tag pairs, each of which identifying a single application that is available to the user at device 10. Example message 76 is sent from the mobile device 10 to middleware server 44 to register for a single server side application. The tags specify information about the user. Message 78 is sent by the middleware server 44 to the mobile device in response to a request to register device 10 for an application. The pair of tags <VALUE> . . . </VALUE> gives a code indicating success or failure. In the sample message shown, a success is shown, and is followed by the interface description for the application, contained between the <INTERFACE> . . . </INTERFACE> tags. This interface description may then be stored locally within memory 16 of device 10.

As noted, when a user starts an application that has been downloaded in the manner described above, the virtual machine software 24 reads the interface description that was downloaded for that device 10, and the virtual machine software 24 identifies the screen that should be displayed on startup, and displays its elements as detailed in relation to FIGS. 9 and 10. The user may then use the functionality defined by the user interface definition section 48 of the application definition 28 to send and receive data from a server side application.

In the event that an error should occur which interferes with normal application operation at a mobile device such as mobile device 10, which error may manifest itself in the display of erroneous information at the mobile device or in a failure of the mobile device to respond to stimuli for example, a user at the mobile device will likely wish to ascertain the cause of the problem with a view to rectifying the problem. In this situation, the user of the mobile device may notify a system administrator at the middleware server 44 (e.g. by telephone or email from a different computing device) so that the administrator may take steps to assess the operational status of the mobile device on the user's behalf. Alternatively, the system administrator may simply wish to assess the status of all or some of the mobile devices which are executing server-side applications, regardless of whether they are currently experiencing errors, for statistical purposes.

In either case, the system administrator may interact with the middleware server software 68 so as to cause the middleware server to "ping" the relevant mobile device to solicit operational status information from the device. Two types of "pings" may exist in an exemplary embodiment. The first type of "ping" is simply an "are you alive" query which either results in a response in the affirmative (if the device is active) or no response (if the device is inactive). The second type of "ping" is a request for device statistics which results in a response containing various forms of device statistics from the relevant mobile device, as described in greater detail below, or no response (if the device is inactive).

Figure 13:
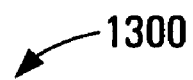
FIG. 13 illustrates the format of a simple ping message which may be sent to a mobile device by a middleware server.

For the first type of ping, a message having the format 1300 illustrated in FIG. 13 may be generated and enqueued for transmission to the mobile device. The message priority may be set sufficiently high so that the message will be sent before all other messages that are queued for transmission to the device. The message may be received by the device through normal device push or pull, depending on how the device is configured.

The administrator's actions may initially cause a new database table TBLMOBILEREQUESTS to be created at the middleware server 44, with the following fields:
  lngMobileID integer,
  dtmLastPingRequest datetime,
  dtmLastPingResponse datetime,
  dtmLastStatisticsRequest datetime,
  dtmLastStatisticsResponse datetime,
  varStatisticsResponse memo If there is no record for the relevant mobile device having the MobileID, one may be inserted into the table, initialized with the current time (e.g. in UTC) in dtmLastPingRequest. The rest of the fields may be null. If there is a record for the current MobileID, dtmLastPingRequest may be set to the current time (e.g. in UTC), and dtmLastPingResponse will be set to null. The other fields need not be updated.

If the record in TBLMOBILEREQUESTS cannot be created/updated for some reason, it may be desirable to notify the system administrator at middleware server 44 of same, e.g., via a message box, and to abort the process without enqueueing a message for transmission. If the message cannot be queued for any reason, it may be desirable to notify the administrator that the ping could not be queued.

The middleware server 44 handles the response to the ping message from the mobile device. The server 44 may stamp the time the response is received into the ping record.

When the ping response is received, the database table TBLMOBILEREQUESTS may be updated for the responding MobileID. The field dtmLastPingResponse may be set to the current date and time (e.g. in UTC). If the record in TBLMOBILEREQUESTS cannot be updated, an error may be written to an error log. Administrator notification of the receipt of a ping response does not necessarily occur automatically.

The ping response may be viewable by the system administrator using the middleware server software 68. The dtmLastPingRequest and dtmLastPingResponse fields may be read from the table TBLMOBILEREQUESTS. A screen may be displayed (e.g. may pop up), containing these two date/times, formatted using the current time zone and locale information. The screen may contain a "Refresh" button, which will retrieve the current values from the table.

If there is no record for the current mobile device, or it cannot be retrieved, the fields may be displayed as being empty.

The system administrator may be required to manually refresh the screen until the ping response is retrieved. However, the administrator may be able to watch an outgoing queue for that device to determine when the device receives the ping.

At the mobile device side, when a "simple" ping request has been received, the device immediately formats, queues, and sends a ping response, which may have the format 1400 of FIG. 14, indicating simply that the device is "alive". The response priority may be set to a high priority, so that the response will be sent ahead of any other messages. If no entry can be created in the queue for the ping response, an error may be written to an error log. As well, if the message cannot be sent immediately, it may be queued for transmission whenever a connection becomes available.

For the second type of "ping", i.e. request for device statistics, if there is no record for the current MobileID in the database table at the middleware server 44, one may be inserted and initialized with the current time (e.g. in UTC) in the dtmLastStatisticsRequest field. The rest of the fields may be null. If there is a record for the current MobileID, the dtmLastStatisticsRequest field may be set to the current time, and the dtmLastStatisticsResponse and varStatisticsResponse fields may be set to null. The other fields may remain unaltered.

Figure 15:
FIG. 15 illustrates the format of a device statistics ping message which may be sent to a mobile device by a middleware server.

Following the table update, a message with the format 1500 illustrated in FIG. 15 may be enqueued for transmission. The priority of this message may be set to high, so that it is queued ahead of any existing messages. The message may then be received by the device through normal device push or pull, depending on how the mobile device is configured. Also, if the record in TBLMOBILEREQUESTS cannot be created/updated, it may be desirable to notify the administrator and to abort the process without queueing the message for transmission. Similarly, if the message cannot be queued for any reason, it may be desired to notify the administrator.

When the ping response is received from the mobile device, the TBLMOBILEREQUESTS database table may be updated for the responding MobileID. The field dtmLastStatisticsResponse may be set to the current date and time, and varStatisticsResponse may be filled with the text of the <PINGRESP> tag. If the record in TBLMOBILEREQUESTS cannot be updated, an error may be written to the error log.

The ping response may be viewable by the system administrator from using the middleware server software 68. The dtmLastStatisticsRequest, dtmLastStatisticsResponse and varStatisticsResponse fields may be read from the table TBLMOBILEREQUESTS. A screen may be displayed (e.g. may pop up), containing these two date/times, formatted using the current time zone and locale information. The screen may contain a scrollable memo box for displaying the response text and a "Refresh" button, which will retrieve the current values from the table.

As before, if there is no record for the current mobile device, or it cannot be retrieved, the fields may be displayed as empty. It is noted that administrator notification of the receipt of a ping response does not necessarily occur automatically. The system administrator may be required to manually refresh the screen until the ping response is retrieved. However, the administrator may be able to watch an outgoing queue for that device to determine when the device receives the ping.

At the mobile device side, when a statistics "ping" request has been received, the device immediately formats, queues, and sends a statistics response, including the following statistics retrieved from the device:

Virtual Machine (Also Referred to as "Smart Client") Configuration
Send/Receive Interval
Other Intervals
Server Address
Notifications
Virtual Machine Diagnostics
Virtual Machine Version
List of last 10 errors that occurred on the device
Top 3 messages in the transaction queue (text)
Number of queued messages
Registered Application ID's
Currently open screen
Device Information
Make & Model
Battery Remaining
Memory Free
Current Network
PIN Number
Operating System Version
Current Date/Time It will be appreciated that the set of statistics that is sent may be different from the set of statistics described above in alternative embodiments. The response priority may be set to high, so that the response will be sent ahead of any other messages.

The statistics response may have the format 1600 of FIG. 16. Depending on the nature of the reported statistics, it may be desired to pass the <PINGRESP> through an XML formatter to replace any illegal XML characters.

The retrieval of the requested statistics may be performed in the following way on the devices:

Smart Client (i.e. Virtual Machine) Configuration
Send/Receive Interval—from tblOptions
Other Intervals—from tblOptions
Server Address—from tblOptions
Notifications—from tblOptions
Smart Client Diagnostics
Smart Client Version—from constant ASC_VERSION
List of last 10 errors that occurred on the device—stored in table tblErrorLog
Top 3 messages in the transaction queue (text)—from tblMessageQueue
Number of queued messages—count records in tblMessageQueue Registered Application ID's—count registered applications from tblApplications
Currently open screen—use Name property of current instance of AlRIXScreen
Device Information (RIM)
Make & Model—RadioInfo.getNetworkType( )—NETWORK_GPRS (7200/6710/6200/5810), NETWORK_CDMA (6750), NETWORK_IDEN (6510)
Battery Remaining—DeviceInfo.getBatteryLevel( )
Memory Free—MemoryStats.getFree( )
Current Network—RadioInfo.getNetworkType( )
PIN Number—DeviceInfo.getDeviceId( )
Operating System Version—DeviceInfo.getOSVersion( )
Current Date/Time—Calendar.getInstance( )
Device Information (PPC)
Make & Model—SystemParamatersInfo(SPI_GETOEMINFO)
Battery Remaining—GetSystemPowerStatusExo
Memory Free—GetDiskFreeSpaceEx( )
Current Network—vendor specific
PIN Number—vendor specific
Operating System Version—SystemParametersInfo (SPI_GETPLATFORMTYPE)
Current Date/Time—GetLocalTime( )
Device Information (Palm)
To be determined If no entry can be created in the queue for the device statistics response, an error may be written to an error log. As well, if the message cannot be sent immediately, it may be queued for transmission whenever a connection becomes available.

It will be understood that the invention is not limited to the embodiments described herein which are merely illustrative of a preferred embodiment of carrying out the invention, and which is susceptible to modification of form, arrangement of parts, steps, details and order of operation. The invention, rather, is intended to encompass all such modification within its scope, as defined by the claims.

What is claimed is:

1. A method for a server to determine an operational status of a wireless communication device capable of executing a server-side application, the method comprising:
sending, from a server to a wireless communication device, an application definition file for defining functionality associated with a server-side application, the application definition file for use by a virtual machine of the wireless communication device, the application definition further defining a format of data flow messages to be transmitted between the server-side application and the virtual machine;
sending a query message to said wireless communication device to solicit operational status information from said wireless communication device; and
receiving a response message from said wireless communication device with the operational status information, wherein the operational status information includes diagnostic information about the virtual machine of the wireless communication device, the diagnostic information indicating a quantity of data flow messages queued by the virtual machine.

2. A method for a wireless communication device capable of executing a server-side application to provide an operational status to a server, the method comprising:
receiving, from a server, an application definition file for defining functionality associated with a server-side application, the application definition further defining a format of data flow messages to be transmitted between the server-side application and the virtual machine;
operating a virtual machine of the wireless communication device in accordance with the application definition file associated with the server-side application;
receiving a query message soliciting operational status information from the wireless communication device; and
sending a response message from said wireless communication device to an originator of said query message, wherein the response message includes diagnostic information about said virtual machine, the diagnostic information indicating a quantity of data flow messages queued by the virtual machine.

3. The method of claim 2 wherein said response message is an eXtensible Markup Language (XML) message.

4. The method of claim 3, further comprising verifying that a textual operational status description forming part of said response message omits illegal XML characters.

5. The method of claim 4 wherein said verifying comprises passing said textual operational status description through an XML formatter for removal of any illegal XML characters.

6. A server comprising a processor and memory in communication with said processor storing machine-executable code adapting said server to:
send, from the server to a wireless communication device, an application definition file for defining functionality associated with a server-side application, the application definition file for use by a virtual machine of the wireless communication device, the application definition further defining a format of data flow messages to be transmitted between the server-side application and the virtual machine;
send a query message to said wireless communication device to solicit operational status information from said wireless communication device; and
receive a response message from said wireless communication device with the operational status information, wherein the operational status information includes diagnostic information about the virtual machine of the wireless communication device, the diagnostic information indicating a quantity of data flow messages queued by the virtual machine.

7. A mobile wireless communication device comprising a processor and memory in communication with said processor storing machine-executable code adapting said device to:
receive, from a server, an application definition file for defining functionality associated with a server-side application, the application definition further defining a format of data flow messages to be transmitted between the server-side application and the virtual machine;
process, at a virtual machine of the wireless communication device, the application definition file to present the server-side application at the wireless communication device;
receive a query message soliciting operational status information from the wireless communication device; and
send a response message from said wireless communication device to an originator of said query message, wherein the response message includes diagnostic information about said virtual machine, the diagnostic information indicating a quantity of data flow messages queued by the virtual machine.

8. The method of claim 1 wherein said diagnostic information about said virtual machine further includes an indication of most frequent messages in a transaction queue of the virtual machine.

9. The method of claim 1 wherein said diagnostic information about said virtual machine further includes an indication of a user interface screen generated by the virtual machine that is currently displayed at said wireless communication device.

10. The method of claim 1 wherein said diagnostic information further includes configuration information about said virtual machine.

11. The method of claim 2 wherein said diagnostic information about said virtual machine further includes an indication of most frequent messages in a transaction queue of the virtual machine.

12. The method of claim 2 wherein said diagnostic information about said virtual machine further includes an indication of a user interface screen generated by the virtual machine that is currently displayed at said wireless communication device.

13. The method of claim 2 wherein said diagnostic information further includes configuration information about said virtual machine.

14. The method of claim 2, further comprising:
   preparing said diagnostic information; and
   composing the response message to include said diagnostic information.

15. The server of claim 6 wherein said diagnostic information about said virtual further includes an indication of most frequent messages in a transaction queue of the virtual machine.

16. The server of claim 6 wherein said diagnostic information about said virtual machine further includes an indication of a user interface screen generated by the virtual machine that is currently displayed at said wireless communication device.

17. The server of claim 6 wherein said diagnostic information further includes configuration information about said virtual machine.

18. The wireless communication device of claim 7 wherein said diagnostic information about said virtual machine further includes an indication of most frequent messages in a transaction queue of the virtual machine.

19. The wireless communication device of claim 7 wherein said diagnostic information about said virtual machine further includes an indication of a user interface screen generated by the virtual machine that is currently displayed at said wireless communication device.

20. The wireless communication device of claim 7 wherein said machine-executable code further adapts said device to:
   prepare said diagnostic information; and
   compose the response message to include said diagnostic information.

* * * * *

UNITED STATES PATENT AND TRADEMARK OFFICE
CERTIFICATE OF CORRECTION

PATENT NO. : 8,224,951 B2  
APPLICATION NO. : 10/537705  
DATED : July 17, 2012  
INVENTOR(S) : Tim Neil et al.

Page 1 of 1

It is certified that error appears in the above-identified patent and that said Letters Patent is hereby corrected as shown below:

In the Claims

Column 20, line 2, "said virtual further includes an indication" should be changed to -- said virtual machine further includes an indication --.

Signed and Sealed this
Third Day of December, 2013

Margaret A. Focarino
*Commissioner for Patents of the United States Patent and Trademark Office*